United States Patent
Fujishita et al.

(10) Patent No.: US 12,168,706 B2
(45) Date of Patent: Dec. 17, 2024

(54) MODIFIED POLYPROPYLENE RESIN AND METHOD FOR PRODUCING SAME, AND EXTRUDED FOAM PARTICLES THAT USE SAID MODIFIED POLYPROPYLENE RESIN AND METHOD FOR THEIR PRODUCTION

(71) Applicant: KANEKA CORPORATION, Osaka (JP)

(72) Inventors: Ayaka Fujishita, Osaka (JP); Takayuki Goda, Osaka (JP)

(73) Assignee: KANEKA CORPORATION, Osaka (JP)

( * ) Notice: Subject to any disclaimer, the term of this patent is extended or adjusted under 35 U.S.C. 154(b) by 816 days.

(21) Appl. No.: 17/132,461

(22) Filed: Dec. 23, 2020

(65) Prior Publication Data
US 2021/0108016 A1  Apr. 15, 2021

Related U.S. Application Data

(63) Continuation of application No. PCT/JP2019/025271, filed on Jun. 26, 2019.

(30) Foreign Application Priority Data

Jun. 28, 2018 (JP) ................... 2018-123472

(51) Int. Cl.
*C08F 255/02* (2006.01)
*C08J 3/24* (2006.01)
*C08J 9/14* (2006.01)

(52) U.S. Cl.
CPC .............. *C08F 255/02* (2013.01); *C08J 3/24* (2013.01); *C08J 9/142* (2013.01); *C08J 2203/12* (2013.01); *C08J 2323/26* (2013.01)

(58) Field of Classification Search
CPC .. C08F 255/02; C08J 3/24; C08J 9/142; C08J 2203/12; C08J 2323/26; C08J 2203/06;
(Continued)

(56) References Cited

U.S. PATENT DOCUMENTS

| | | | | |
|---|---|---|---|---|
| 6,204,348 B1 * | 3/2001 | Raetzsch | ................... | C08F 8/50 526/901 |
| 6,239,185 B1 * | 5/2001 | Braun | ........................ | C08J 9/18 521/58 |

(Continued)

FOREIGN PATENT DOCUMENTS

| | | |
|---|---|---|
| CN | 102574948 A | 7/2012 |
| CN | 106795249 A | 5/2017 |

(Continued)

OTHER PUBLICATIONS

Extended European Search Report issued in corresponding European Application No. 19824993.0 mailed Mar. 24, 2022 (8 pages).

(Continued)

*Primary Examiner* — Michael M Dollinger
*Assistant Examiner* — Christina H. W. Rosebach
(74) *Attorney, Agent, or Firm* — Osha Bergman Watanabe & Burton LLP

(57) ABSTRACT

A novel modified polypropylene resin is provided which makes it possible to provide, by an extrusion expansion method, expanded polypropylene-based resin particles having an expansion ratio which falls within a wide range and having a low open cell ratio. The novel modified polypropylene resin is obtained by a method of producing the modified polypropylene resin where the method includes a melting and kneading step of melting and kneading a particular random polypropylene resin, a conjugated diene compound, and a particular radical polymerization initiator to obtain the modified polypropylene resin.

7 Claims, 1 Drawing Sheet

(58) Field of Classification Search
CPC .... C08J 9/122; C08J 2201/03; C08J 2205/05; C08J 9/16; C08J 2323/16; C08J 3/243
See application file for complete search history.

(56) References Cited

U.S. PATENT DOCUMENTS

| | | | |
|---|---|---|---|
| 2015/0203621 A1* | 7/2015 | Prokschi | C08J 9/00 521/143 |
| 2017/0029611 A1 | 2/2017 | Amano | |
| 2019/0153188 A1* | 5/2019 | Nakayama | C08J 9/16 |

FOREIGN PATENT DOCUMENTS

| | | | | |
|---|---|---|---|---|
| EP | 879830 B1 * | 11/2002 | | B29B 7/48 |
| JP | H9-278836 A | 10/1997 | | |
| JP | H9-302131 A | 11/1997 | | |
| JP | H9-309964 A | 12/1997 | | |
| JP | 2001-001384 A | 1/2001 | | |
| JP | 2009-256460 A | 11/2009 | | |
| JP | 2009-293020 A | 12/2009 | | |
| JP | 5342922 B2 | 11/2013 | | |
| WO | 2015/159869 A1 | 10/2015 | | |
| WO | WO-2018016399 A1 * | 1/2018 | | B29B 7/007 |

OTHER PUBLICATIONS

Office Action issued in corresponding Chinese Application No. 201980043344.1 dated Feb. 4, 2023 (10 pages).
International Preliminary Report on Patentability issued in corresponding International Application No. PCT/JP2019/025271 dated Dec. 29, 2020 (8 pages).
International Search Report issued in corresponding International Application No. PCT/JP2019/025271 mailed Sep. 10, 2019 (2 pages).

* cited by examiner

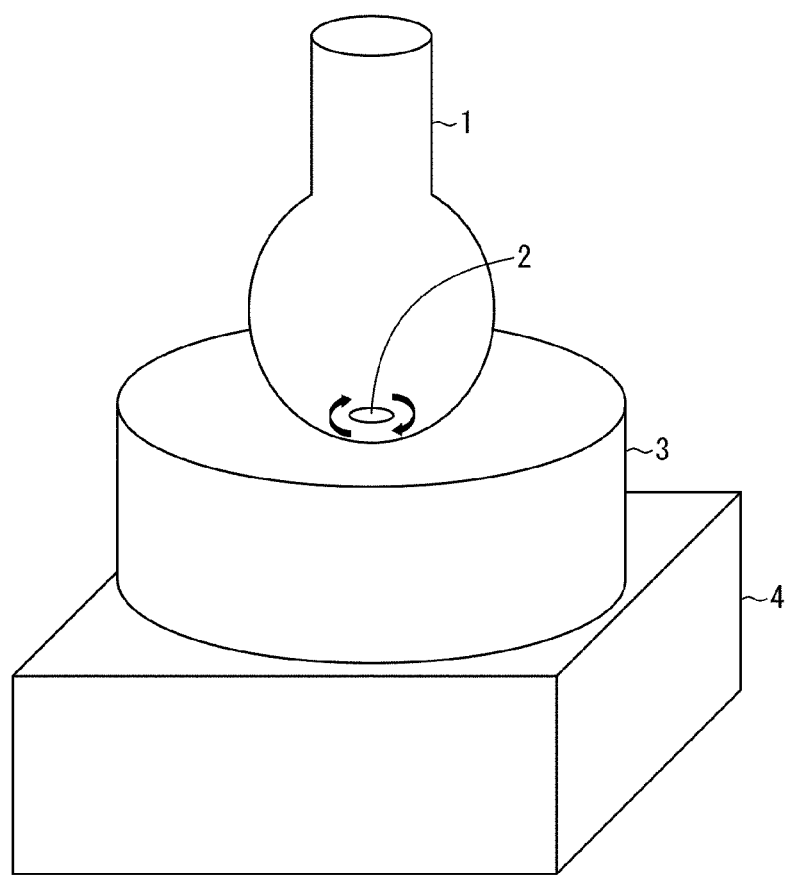

MODIFIED POLYPROPYLENE RESIN AND METHOD FOR PRODUCING SAME, AND EXTRUDED FOAM PARTICLES THAT USE SAID MODIFIED POLYPROPYLENE RESIN AND METHOD FOR THEIR PRODUCTION

TECHNICAL FIELD

One or more embodiments of the present invention relate to a modified polypropylene resin and a method of producing the same, and relates to extruded expanded particles obtained from the modified polypropylene resin and a method of producing the same.

BACKGROUND

In-mold foamed molded polypropylene-based resin articles obtained from expanded polypropylene-based resin particles have characteristics of, for example, being formed in any shape, being shock-absorbing, being light in weight, and being heat insulating, which characteristics are advantages of in-mold foamed molded articles.

However, it is difficult to obtain expanded polypropylene-based resin particles having good moldability by an extrusion expansion method, which is a continuous process.

Conventionally, as a technique for obtaining expanded polypropylene-based resin particles by an extrusion expansion method, Patent Literatures 1 and 2 discloses the following techniques.

Patent Literature 1 discloses a method in which (i) a modified polypropylene-based resin composition is produced with use of a polypropylene-based resin, an aromatic vinyl monomer, and/or an isoprene monomer and a radical generating agent and (ii) expanded particles are produced by an extrusion expansion method with use of the modified polypropylene-based resin composition.

Patent Literature 2 discloses a technique characterized in that, in a case where pre-expanded polypropylene-based resin particles are obtained by an extrusion expansion method with use of a polypropylene-based resin, a half-width of a melting point peak obtained by measuring crystal melting of the pre-expanded polypropylene-based resin particles by differential scanning calorimetry is not less than 20° C.

Further, conventionally, as a resin used to obtain expanded polypropylene-based resin particles by an extrusion expansion method, a resin composition for extrusion expansion molding (Patent Literature 3) obtained with use of a propylene-based polymer satisfying a particular requirement is disclosed.

Further, as a resin used to produce an expanded polypropylene-based resin article by an extrusion expansion method, a non-crosslinked polypropylene-based resin (Patent Literature 4) satisfying a particular requirement is disclosed.

[Patent Literature 1]
  Japanese Patent Application Publication Tokukaihei No. 9-302131
[Patent Literature 2]
  Japanese Patent Application Publication Tokukai No. 2009-256460
[Patent Literature 3]
  Japanese Patent Application Publication Tokukai No. 2009-293020
[Patent Literature 4]
  Japanese Patent Application Publication Tokukaihei No. 9-309964

However, conventional techniques as described above are not sufficient from the viewpoint of obtaining, by an extrusion expansion method, expanded polypropylene-based resin particles having an expansion ratio which falls within a wide range and having a low open cell ratio, and there is room for further improvement.

SUMMARY

One or more embodiments of the present invention has been made to provide a novel modified polypropylene resin which makes it possible to provide, by an extrusion expansion method, expanded polypropylene-based resin particles having an expansion ratio which falls within a wide range and having a low open cell ratio.

The inventors of one or more embodiments of the present invention conducted diligent studies in order to attain the above, and consequently found that use of a particular radical polymerization initiator allows obtainment of a novel modified polypropylene resin which makes it possible to provide, by an extrusion expansion method, expanded polypropylene-based resin particles having an expansion ratio which falls within a wide range and having a low open cell ratio. As a result, the inventors completed one or more embodiments of the present invention.

That is, a method of producing a modified polypropylene resin in accordance with one or more embodiments of the present invention is a method of producing a modified polypropylene resin, the method including: a melting and kneading step of melting and kneading a random polypropylene resin, a conjugated diene compound, and a radical polymerization initiator to obtain a modified polypropylene resin, the random polypropylene resin containing an ethylene unit in an amount of more than 0.0% by weight and not more than 2.5% by weight with respect to 100 parts by weight of the random polypropylene resin, a melt flow rate (MFR) of the random polypropylene resin being not less than 5.0 g/10 minutes and not more than 20.0 g/10 minutes, an amount of the conjugated diene compound blended in the melting and kneading step being not less than 0.01 parts by weight and not more than 5.00 parts by weight with respect to 100 parts by weight of the random polypropylene resin, an amount of the radical polymerization initiator blended in the melting and kneading step being not less than 0.01 parts by weight and not more than 5.00 parts by weight with respect to 100 parts by weight of the random polypropylene resin, the radical polymerization initiator being a mixture containing at least one kind of organic peroxide (A) having a structure represented by the following General Formula (1) and at least one kind of organic peroxide (B) having at least one structure represented by the following General Formula (4) or (5), a ten-hour half-life temperature of each of the at least one kind of organic peroxide (A) and the at least one kind of organic peroxide (B) being 90° C. to 150° C.,

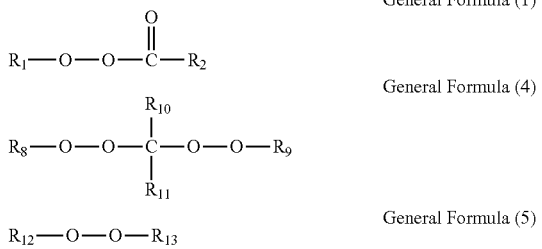

General Formula (1)

General Formula (4)

General Formula (5)

where: $R_1$, $R_8$, $R_9$, and $R_{13}$ are each independently hydrogen, a substituted or unsubstituted alkyl group having 1 to 8 carbon atoms, or a substituted or unsubstituted aryl group having 6 to 12 carbon atoms, and may be identical to or different from each other; $R_2$ is a substituted or unsubstituted alkyl group having 1 to 8 carbon atoms, a substituted or unsubstituted aryl group having 6 to 12 carbon atoms, or a substituted or unsubstituted alkoxy group having 1 to 8 carbon atoms; $R_{10}$ and $R_{11}$ (a) are each independently a substituted or unsubstituted alkyl group having 1 to 8 carbon atoms or a substituted or unsubstituted aryl group having 6 to 12 carbon atoms, and may be identical to or different from each other or (b) form a substituted or unsubstituted cycloalkyl group having 3 to 8 carbon atoms together; and $R_{12}$ is a substituted or unsubstituted alkyl group having 1 to 10 carbon atoms or a substituted or unsubstituted aryl group having 6 to 12 carbon atoms.

A modified polypropylene resin in accordance with one or more embodiments of the present invention is a modified polypropylene resin in which a ratio ($\eta 30/\eta 1$) between an elongation viscosity $\eta 1$ for an elongation time of 1 second and an elongation viscosity $\eta 30$ for an elongation time of 30 seconds is not less than 40.0 and not more than 100.0, each of the elongation viscosity $\eta 1$ and the elongation viscosity $\eta 30$ being measured at a temperature of 180° C. and a strain rate of 0.1/second.

Extruded expanded polypropylene-based resin particles in accordance with one or more embodiments of the present invention are extruded expanded polypropylene-based resin particles which have a single crystallization peak in a DSC curve obtained by DSC, an expansion ratio of not less than 2.0 times and less than 30.0 times, and an open cell ratio of not less than 0.0% and not more than 20.0%.

According to one or more embodiments of the present invention, it is possible to obtain a modified polypropylene resin which makes it possible to provide, by an extrusion expansion method, expanded polypropylene-based resin particles having an expansion ratio which falls within a wide range and having a low open cell ratio.

BRIEF DESCRIPTION OF DRAWINGS

FIG. 1 is a schematic view illustrating instrumentation for measuring a gel fraction.

DETAILED DESCRIPTION

The following description will discuss one or more embodiments of the present invention. Note, however, that one or more embodiments of the present invention is not limited to such an embodiment. One or more embodiments of The present invention is not limited to arrangements described below, but may be altered in various ways by a skilled person within the scope of the claims. Any embodiment or example derived from a proper combination of technical means disclosed in different embodiments or examples is also encompassed in the technical scope of one or more embodiments of the present invention. Furthermore, a new technical feature can be formed by a combination of technical means disclosed in different embodiments. All academic and patent literatures cited herein are incorporated herein by reference. Unless otherwise specified herein, a numerical range expressed as "A to B" means "not less than A (equal to or more than A) and not more than B (equal to or less than B)".

[1. Technical Idea of One or More Embodiments of the Present Invention]

As a result of conducting diligent studies, the inventors of one or more embodiments of the present invention newly obtained findings as shown below, in regard to the techniques disclosed in Patent Literatures 1 through 3.

For example, the technique of Patent Literature 1 allows obtainment of expanded particles having a low density, a high closed cell ratio, a beautiful appearance, and an excellent heat resistance. The technique of Patent Literature 2 makes it possible to obtain, at low costs, a good in-mold foamed molded article inside which, due to good balance between fusibility and low shrinkage during in-mold molding, the pre-expanded polypropylene-based resin particles are fused together even in a case where a mold is so thick that distribution of temperature is likely to occur in the mold.

However, the inventors of one or more embodiments of the present invention newly found that expanded polypropylene-based resin particles produced by the technique disclosed in each of Patent Literatures 1 and 2 have surfaces which are poorly elongated during in-mold foam molding. Furthermore, the inventors of one or more embodiments of the present invention newly found that, in a case where an in-mold foamed molded article is produced by in-mold foam molding with use of expanded polypropylene-based resin particles produced by the technique disclosed in Patent Literature 1, the in-mold foamed molded article severely shrinks immediately after being molded. For these reasons, the inventors of one or more embodiments of the present invention newly found that in-mold foam molding in which expanded polypropylene-based resin particles produced by the technique disclosed in each of Patent Literatures 1 and 2 are used does not allow the expanded polypropylene-based resin particles to be molded at a wide range of molding pressures. According to the technique disclosed in Patent Literature 2, although the molded article obtained by in-mold foam molding exhibits low shrinkage, still lower shrinkage is demanded from the viewpoint of practical uses.

Although Patent Literatures 3 and 4 each disclose a polypropylene-based resin having an excellent extrusion expansion property, Patent Literatures 3 and 4 each do not disclose a method of producing a particulate expanded article (expanded particles). The inventors of one or more embodiments of the present invention newly found that, even in a case where the polypropylene-based resin disclosed in each of Patent Literatures 3 and 4 is used, expanded particles having excellent moldability during in-mold molding may not be obtained.

Here, the inventors of one or more embodiments of the present invention conducted diligent studies and, as a result, uniquely inferred that a main reason why expanded particles having excellent moldability cannot be obtained is that expanded particles having a high expansion ratio have a high open cell ratio. That is, as described above, conventional techniques are not sufficient from the viewpoint of obtaining, by an extrusion expansion method, expanded polypropylene-based resin particles having an expansion ratio which falls within a wide range and having a low open cell ratio.

[2. Method of Producing Modified Polypropylene Resin]

A method of producing a modified polypropylene resin in accordance with one or more embodiments of the present invention is a method of producing a modified polypropylene resin, the method including: a melting and kneading step of melting and kneading a random polypropylene resin, a conjugated diene compound, and a radical polymerization initiator to obtain a modified polypropylene resin, the random polypropylene resin containing an ethylene unit in an amount of more than 0.0% by weight and not more than 2.5% by weight with respect to 100 parts by weight of the random polypropylene resin, a melt flow rate (MFR) of the random polypropylene resin being not less than 5.0 g/10 minutes and not more than 20.0 g/10 minutes, an amount of the conjugated diene compound blended in the melting and kneading step being not less than 0.01 parts by weight and not more than 5.00 parts by weight with respect to 100 parts by weight of the random polypropylene resin, an amount of the radical polymerization initiator blended in the melting and kneading step being not less than 0.01 parts by weight and not more than 5.00 parts by weight with respect to 100 parts by weight of the random polypropylene resin, the radical polymerization initiator being a mixture containing at least one kind of organic peroxide (A) having a structure represented by the General Formula (1) and at least one kind of organic peroxide (B) having at least one structure represented by the General Formula (4) or (5), a ten-hour half-life temperature of each of the at least one kind of organic peroxide (A) and the at least one kind of organic peroxide (B) being 90° C. to 150° C.

Since the method of producing a modified polypropylene resin in accordance with one or more embodiments of the present invention is arranged as described above, it is possible to provide a modified polypropylene resin which makes it possible to provide, by an extrusion expansion method, expanded polypropylene-based resin particles having an expansion ratio which falls within a wide range and having a low open cell ratio.

It can be also said that, since the method of producing a modified polypropylene resin in accordance with one or more embodiments of the present invention is arranged as described above, it is possible to provide a modified polypropylene resin which makes it possible to provide, by an extrusion expansion method, expanded polypropylene-based resin particles having excellent moldability.

Specifically, according to the method of producing a modified polypropylene resin in accordance with one or more embodiments of the present invention, it is possible to provide a modified polypropylene resin in which a ratio ($\eta 30/\eta 1$) between an elongation viscosity $\eta 1$ for an elongation time of 1 second and an elongation viscosity $\eta 30$ for an elongation time of 30 seconds is not less than 40.0 and not more than 100.0. By using the modified polypropylene resin thus obtained, it is possible to ultimately provide extruded expanded polypropylene-based resin particles which have (a) a single crystallization peak in a DSC curve obtained by DSC, (b) an expansion ratio of not less than 2.0 times and less than 30.0 times, and (c) an open cell ratio of not less than 0.0% and not more than 20.0%. Note, here, that each of the elongation viscosity $\eta 1$ and the elongation viscosity $\eta 30$ is an elongation viscosity measured at a temperature of 180° C. and a strain rate of 0.1/second.

<Random Polypropylene Resin>

The random polypropylene resin used in one or more embodiments of the present invention is a copolymer which at least contains a propylene unit and an ethylene unit as constitutional units. A main constitutional unit of the random polypropylene resin used in one or more embodiments of the present invention is the propylene unit. The propylene unit and the ethylene unit contained in the random polypropylene resin used in one or more embodiments of the present invention are randomly linked together. Note, here, that the "propylene unit" is a constitutional unit derived from a propylene monomer, and the "ethylene unit" is a constitutional unit derived from an ethylene monomer. Note also that "A main constitutional unit is the propylene unit" means that, in a case where a total number of constitutional units contained in the random polypropylene resin is regarded as 100%, the number of propylene units accounts for not less than 50% of the total number.

The random polypropylene resin may have a constitutional unit derived from $\alpha$-olefin, which constitutional unit is different from the propylene unit and the ethylene unit. Examples of the $\alpha$-olefin include: (a) $\alpha$-olefin having 2 or 4 to 12 carbon atoms, such as 1-butene, isobutene, 1-pentene, 3-methyl-1-butene, 1-hexene, 4-methyl-1-pentene, 3,4-dimethyl-1-butene, 1-heptene, 3-methyl-1-hexene, 1-octene, and 1-decene; (b) cyclic olefin such as cyclopentene, norbornene, and tetracyclo[6,2,11,8,13,6]-4-dodecene; (c) diene such as 5-methylene-2-norbornene, 5-ethylidene-2-norbornene, 1,4-hexadiene, methyl-1,4-hexadiene, and 7-methyl-1,6-octadiene; (d) and vinyl monomers such as vinyl chloride, vinylidene chloride, acrylonitrile, vinyl acetate, acrylic acid, methacrylic acid, maleic acid, ethyl acrylate, butyl acrylate, methyl methacrylate, maleic anhydride, styrene, methylstyrene, vinyltoluene, and divinylbenzene. Each of these $\alpha$-olefins other than the propylene monomer and the ethylene monomer may be used solely. Alternatively, two or more of these $\alpha$-olefins may be used in combination.

The amount of the ethylene unit contained in the random polypropylene resin used in one or more embodiments of the present invention is more than 0.0% by weight and not more than 2.5% by weight, preferably not less than 0.5% by weight and not more than 2.5% by weight, more preferably not less than 1.0% by weight and not more than 2.5% by weight, still more preferably not less than 1.5% by weight and not more than 2.5% by weight, and particularly preferably not less than 1.8% by weight and not more than 2.2% by weight, with respect to 100 parts by weight of the random polypropylene resin. According to this arrangement, the method of producing a modified polypropylene resin in accordance with one or more embodiments of the present invention has an advantage that the modified polypropylene resin having a low gel fraction is obtained.

An amount of the ethylene unit contained in the modified polypropylene resin obtained by the method of producing a modified polypropylene resin in accordance with one or more embodiments of the present invention does not exceed the amount of the ethylene unit contained in the random polypropylene resin used. Therefore, in a case where the amount of the ethylene unit contained in the modified polypropylene resin is not more than 2.5% by weight with respect to 100 parts by weight of the modified polypropylene resin, it is highly likely that the amount of the ethylene unit contained in the random polypropylene resin used to produce the modified polypropylene resin is not more than 2.5% by weight with respect to 100 parts by weight of the random polypropylene resin.

The MFR of the random polypropylene resin used in one or more embodiments of the present invention is not less than 5.0 g/10 minutes and not more than 20.0 g/10 minutes, preferably not less than 5.0 g/10 minutes and not more than 17.0 g/10 minutes, more preferably not less than 5.0 g/10 minutes and not more than 14.0 g/10 minutes, still more preferably not less than 5.0 g/10 minutes and not more than 11.0 g/10 minutes, and particularly preferably not less than 5.0 g/10 minutes and not more than 8.0 g/10 minutes. This arrangement brings about an advantage that an in-mold foamed molded article which is ultimately obtained with use of the modified polypropylene resin obtained by the method of producing a modified polypropylene resin in accordance with one or more embodiments of the present invention tends to be less deformed and be excellent in surface appearance.

Note, here, that a value of the MFR is a value measured with use of an MFR measuring apparatus described in JIS K7210 under the following conditions: a diameter of an orifice is 2.0959±0.0050 mmφ; a length of the orifice is 8.000±0.025 mm; a load is 2160 g; and a temperature is 230±0.2° C.

A melting point of the random polypropylene resin used in one or more embodiments of the present invention is not limited to any particular one, and is, for example, preferably not less than 130° C. and not more than 155° C., more preferably not less than 135° C. and not more than 153° C., and particularly preferably not less than 140° C. and not more than 150° C. In a case where the melting point of the random polypropylene resin is (a) not less than 130° C., it is less likely that dimensional stability of the in-mold foamed molded article is decreased, and it is less likely that heat resistance of the in-mold foamed molded article becomes insufficient. In a case where the melting point of the random polypropylene resin is (b) not more than 155° C., it is less likely that a heating steam pressure for molding during in-mold foam molding becomes high.

Note, here, that the melting point of the random polypropylene resin is measured by differential scanning calorimetry (hereinafter referred to as a "DSC method"). A specific operation procedure is as follows: (1) 5 mg to 6 mg of the random polypropylene resin is heated from 40° C. to 220° C. at a rate of 10° C./minute so that the random polypropylene resin is melted; (2) the random polypropylene resin is then cooled from 220° C. to 40° C. at a rate of 10° C./minute so that the random polypropylene resin is crystallized; and (3) the random polypropylene resin is heated again from 40° C. to 220° C. at a rate of 10° C./minute. A temperature at a peak (melting peak) in a DSC curve obtained after the second heating (that is, (3)) can be regarded as the melting point. As a differential scanning calorimeter, a differential scanning calorimeter of a DSC6200 type available from Seiko Instruments Inc. can be, for example, used.

In the melting and kneading step in accordance with one or more embodiments of the present invention, a synthetic resin other than the random polypropylene resin may be used in combination with the random polypropylene resin, the conjugated diene compound, and the radical polymerization initiator, provided that an effect of one or more embodiments of the present invention is not impaired. Examples of the synthetic resin other than the random polypropylene resin include: (a) ethylene-based resins such as high-density polyethylene, medium-density polyethylene, low-density polyethylene, linear low-density polyethylene, linear very-low-density polyethylene, an ethylene-vinyl acetate copolymer, an ethylene-acrylic acid copolymer, and an ethylene-methacrylic acid copolymer; and (b) styrene-based resins such as polystyrene, a styrene-maleic anhydride copolymer, and a styrene-ethylene copolymer.

<Conjugated Diene Compound>

Examples of the conjugated diene compound used in one or more embodiments of the present invention include butadiene, isoprene, 1,3-heptadiene, 2,3-dimethylbutadiene, and 2,5-dimethyl-2,4-hexadiene. Each of these conjugated diene compounds may be used solely or two or more of these conjugated diene compounds may be used in combination. Out of these conjugated diene compounds, butadiene and isoprene are particularly preferable because (a) they are inexpensive and easy to handle and (b) they are likely to undergo uniform reaction.

The amount of the conjugated diene compound blended in the melting and kneading step in accordance with one or more embodiments of the present invention is not less than 0.01 parts by weight and not more than 5.00 parts by weight, preferably not less than 0.05 parts by weight and not more than 4.00 parts by weight, more preferably not less than 0.10 parts by weight and not more than 3.00 parts by weight, still more preferably not less than 0.2 parts by weight and not more than 2.50 parts by weight, and particularly preferably not less than 0.30 parts by weight and not more than 2.00 parts by weight, with respect to 100 parts by weight of the random polypropylene resin. In a case where the amount of the conjugated diene compound blended is less than 0.01 parts by weight, an effect of modification, that is, an increase in melt tension and an expression of strain hardening property cannot be achieved. In a case where the amount of the conjugated diene compound blended is more than 5.00 parts by weight, crosslinking by the conjugated diene compound becomes excessive, so that the modified polypropylene resin having a high viscosity is obtained. This consequently makes it difficult to obtain, from the modified polypropylene resin obtained, extruded expanded polypropylene-based resin particles having a high expansion ratio.

In the melting and kneading step in accordance with one or more embodiments of the present invention, a monomer copolymerizable with the conjugated diene compound may be used in combination with the random polypropylene resin, the conjugated diene compound, and the radical polymerization initiator, provided that an effect of one or more embodiments of the present invention is not impaired. Examples of the monomer copolymerizable with the conjugated diene compound include: (a) acrylic ester such as vinyl chloride, vinylidene chloride, acrylonitrile, methacrylonitrile, acrylamide, methacrylamide, vinyl acetate, acrylic acid, methacrylic acid, maleic acid, maleic anhydride, acrylic metal salt, methacrylic metal salt, methyl acrylate, ethyl acrylate, butyl acrylate, 2-ethylhexyl acrylate, and stearyl acrylate; and (b) methacrylic ester such as methyl methacrylate, ethyl methacrylate, butyl methacrylate, 2-ethylhexyl methacrylate, and stearyl methacrylate.

<Radical Polymerization Initiator>

The radical polymerization initiator in accordance with one or more embodiments of the present invention is an organic peroxide having an ability to abstract hydrogen from the random polypropylene resin and the conjugated diene compound. The mixture of the radical polymerization initiator in accordance with one or more embodiments of the present invention may contain a peroxide and/or an azo compound other than the organic peroxide (A) and the organic peroxide (B), provided that an effect of one or more embodiments of the present invention is not impaired.

In the General Formulae (1), (4), and (5), $R_1$, $R_8$, $R_9$ and $R_{13}$ are each independently preferably hydrogen, a substituted or unsubstituted alkyl group having 1 to 8 carbon atoms (preferably 1 to 7, more preferably 1 to 6, more preferably 1 to 5, still more preferably 1 to 4, particularly preferably 4 carbon atoms), or a substituted or unsubstituted aryl group having 6 to 12 carbon atoms (preferably 6 to 8, more preferably 6 to 7, particularly preferably 6 carbon atoms), and may be identical to or different from each other.

In the General Formulae (1), (4), and (5), $R_1$, $R_8$, and $R_9$ are each preferably the substituted or unsubstituted alkyl group, and more preferably the unsubstituted alkyl group, out of the hydrogen, the substituted or unsubstituted alkyl group, and the substituted or unsubstituted aryl group. In the General Formulae (1), (4), and (5), $R_1$, $R_8$, $R_9$ and $R_{13}$ are each most preferably the unsubstituted alkyl group having 4 carbon atoms.

In the General Formula (5), $R_{13}$ is particularly preferably the hydrogen, out of the hydrogen, the substituted or unsubstituted alkyl group, and the substituted or unsubstituted aryl group.

In the General Formula (1), $R_2$ is preferably a substituted or unsubstituted alkyl group having 1 to 8 carbon atoms (preferably 1 to 7, more preferably 1 to 6, more preferably 1 to 5, still more preferably 1 to 4, particularly preferably 4 carbon atoms), a substituted or unsubstituted aryl group having 6 to 12 carbon atoms (more preferably 6 to 8, more preferably 6 to 7, particularly preferably 6 carbon atoms), or a substituted or unsubstituted alkoxy group having 1 to 8 carbon atoms (preferably 1 to 7, more preferably 1 to 6, more preferably 1 to 5, still more preferably 1 to 4, particularly preferably 4 carbon atoms), and may be identical to or different from each other.

In the General Formula (1), $R_2$ is preferably the substituted or unsubstituted alkoxy group, and more preferably the unsubstituted alkoxy group, out of the substituted or unsubstituted alkyl group, the substituted or unsubstituted aryl group, and the substituted or unsubstituted alkoxy group. In the General Formula (1), $R_2$ is most preferably the unsubstituted alkoxy group having 4 carbon atoms.

In the General Formula (4), preferably, $R_{10}$ and $R_{11}$ (a) are each independently a substituted or unsubstituted alkyl group having 1 to 8 carbon atoms (preferably 1 to 7, more preferably 1 to 6, more preferably 1 to 4, still more preferably 1 to 2 carbon atoms) or a substituted or unsubstituted aryl group having 6 to 12 carbon atoms (preferably 6 to 8, more preferably 6 to 7, particularly preferably 6 carbon atoms), and may be identical to or different from each other or (b) form a substituted or unsubstituted cycloalkyl group having 3 to 8 carbon atoms (more preferably 3 to 7, more preferably 3 to 6, more preferably 3 to 5, still more preferably 3 to 4, particularly preferably 3 carbon atoms) together.

In the General Formula (4), $R_{10}$ and $R_{11}$ are preferably the substituted or unsubstituted alkyl group, and more preferably the unsubstituted alkyl group, out of the substituted or unsubstituted alkyl group, the substituted or unsubstituted aryl group, and the substituted or unsubstituted cycloalkyl group. In the General Formula (4), it is most preferable that (a) $R_{10}$ is the unsubstituted alkyl group having 1 carbon atom and $R_{11}$ is the unsubstituted alkyl group having 2 carbon atoms or (b) $R_{10}$ is the unsubstituted alkyl group having 2 carbon atoms and $R_{11}$ is the unsubstituted alkyl group having 1 carbon atom.

In the General Formula (5), $R_{12}$ is preferably a substituted or unsubstituted alkyl group having 1 to 10 carbon atoms (preferably 1 to 7, more preferably 1 to 6, more preferably 1 to 5, still more preferably 1 to 4, particularly preferably 4 carbon atoms) or preferably a substituted or unsubstituted aryl group having 6 to 12 carbon atoms (preferably 6 to 8, more preferably 6 to 7, particularly preferably 6 carbon atoms).

In the General Formula (5), $R_{12}$ is preferably the substituted or unsubstituted alkyl group, and more preferably the unsubstituted alkyl group, out of the substituted or unsubstituted alkyl group and the substituted or unsubstituted aryl group. In the General Formula (5), $R_{12}$ is most preferably the unsubstituted alkyl group having 4 carbon atoms.

Note, here, that the alkyl group includes not only linear alkyl groups but also branched and cyclic alkyl groups. Similarly, the alkylene group includes not only linear alkylene groups but also branched and cyclic alkylene groups. Note also that "substituted" means that a carbon atom or a hydrogen atom of a functional group is substituted by an oxygen atom, a sulfur atom, a nitrogen atom, an aromatic group, and/or the like.

The organic peroxide (A) preferably has a hydrogen-abstracting ability and polymerizability. Examples of the organic peroxide (A) include (a) peroxyester such as t-butyl peroxyoctoate, t-butyl peroxyisobutyrate, t-butyl peroxylaurate, t-butyl peroxy-3,5,5-trimethyl hexanoate, t-butyl peroxyisopropylmonocarbonate, 2,5-dimethyl-2,5-di(benzoyl peroxy)hexane, t-butyl peroxyacetate, t-butyl peroxybenzoate, and di-t-butyl peroxyisophthalate; (b) diacyl peroxide such as benzoyl peroxide; and (c) peroxydicarbonate. Out of these organic peroxides, the organic peroxide (A) is preferably peroxyester. Note, here, that the "polymerizability" is performance that a radical generated from the random polypropylene resin, isoprene, and the radical polymerization initiator easily undergoes an addition reaction with respect to a double bond moiety.

The organic peroxide (A) is more preferably peroxyester having the structure represented by the General Formula (1) where $R_1$ and $R_2$ are each independently the unsubstituted alkyl group having 1 to 4 carbon atoms.

The organic peroxide (B) preferably has a hydrogen-abstracting ability higher than that of the organic peroxide (A). The organic peroxide (B) preferably has polymerizability lower than that of the organic peroxide (A). Examples of the organic peroxide (B) include (a) peroxyketal such as 1,1-bis(t-butyl peroxy)3,3,5-trimethyl cyclohexane, 1,1-bis (t-butyl peroxy)cyclohexane, n-butyl 4,4-bis(t-butyl peroxy) valerate, and 2,2-di(t-butyl peroxy)butane, (b) ketone peroxide, (c) dialkyl peroxide such as dicumyl peroxide, 2,5-dimethyl-2,5-di(t-butyl peroxy)hexane, α,α'-bis(t-butyl peroxy-m-isopropyl)benzene, t-butyl cumyl peroxide, di-t-butyl peroxide, and 2,5-dimethyl-2,5-di(t-butyl peroxy)-3-hexyne, and (d) hydroperoxide. Out of these organic peroxides, the organic peroxide (B) is preferably peroxyketal.

The organic peroxide (B) having the structure represented by the General Formula (4) is preferable to the organic peroxide (B) having the structure represented by the General Formula (5), because a ten-hour half-life temperature of the organic peroxide (B) having the structure represented by the General Formula (4) is more suitable for a melting temperature of polypropylene. It can be also said that the organic peroxide (B) having the structure represented by the General Formula (4) is peroxyketal.

The organic peroxide (B) is more preferably peroxyketal having the structure represented by the General Formula (4) where $R_8$ and $R_9$ are each independently the unsubstituted alkyl group having 1 to 4 carbon atoms; and $R_{10}$ and $R_{11}$ are each independently the unsubstituted alkyl group having 1 to 2 carbon atoms.

The ten-hour half-life temperature of each of the organic peroxide (A) and the organic peroxide (B) is 90° C. to 150° C., preferably 90° C. to 140° C., more preferably 90° C. to 130° C., still more preferably 90° C. to 120° C., and particularly preferably 95° C. to 115° C. A solvent used in measurement of the ten-hour half-life temperature of each of the organic peroxide (A) and the organic peroxide (B) is not limited to any particular one. Examples of the solvent include toluene and benzene. In the measurement of the ten-hour half-life temperature of each of the organic peroxide (A) and the organic peroxide (B), a concentration of the organic peroxide (A) or the organic peroxide (B) in the solvent is not limited to any particular one, and may be, for example, 0.1 mol/L to 0.2 mol/L.

The amount of the radical polymerization initiator blended in the melting and kneading step in accordance with one or more embodiments of the present invention is not less than 0.01 parts by weight and not more than 5.00 parts by weight, preferably not less than 0.05 parts by weight and not more than 4.00 parts by weight, more preferably not less than 0.15 parts by weight and not more than 3.00 parts by weight, still more preferably not less than 0.30 parts by weight and not more than 2.50 parts by weight, and particularly preferably not less than 0.50 parts by weight and not more than 2.00 parts by weight, with respect to 100 parts by weight of the random polypropylene resin. In a case where the amount of the radical polymerization initiator blended is less than 0.01 parts by weight, the effect of the modification, that is, the increase in melt tension and the expression of the strain hardening property cannot be easily achieved. In a case where the amount of the radical polymerization initiator blended is more than 5.00 parts by weight, abstraction of hydrogen from the random polypropylene resin by the radical polymerization initiator in the melting and kneading step is increased. This tends to cause an increase in radicalization of the random polypropylene resin, and accordingly tends to cause obtainment of the random polypropylene resin having a low molecular weight. As a result, in a case where extruded expanded polypropylene-based resin particles are produced by the extrusion expansion method with use of the random polypropylene resin thus obtained, a decrease in pressure of a die tends to be caused, and extruded expanded polypropylene-based resin particles having a high open cell ratio tends to be easily obtained.

As used herein, the term "blended" can be also read as "added" or "used". Further, the terms "blended", "added", and "used" are terms used in manufacture, and may be read as "contained" in a substance obtained by the manufacture. As used herein, the terms "blended", "added", "used", and "contained" are interchangeable, and the terms "blended amount", "added amount", "used amount" and "contained amount" are interchangeable.

The amount of the radical polymerization initiator blended can be read as the amount of the mixture of the radical polymerization initiator which mixture contains the organic peroxide (A) and the organic peroxide (B).

The mixture of the radical polymerization initiator may contain the organic peroxide (A) in an amount of not less than 50.0% by weight and not more than 80.0% by weight and the organic peroxide (B) in an amount of not less than 20.0% by weight and not more than 50.0% by weight, in a case where a total amount of the organic peroxide (A) and the organic peroxide (B) is regarded as 100% by weight. The mixture of the radical polymerization initiator preferably contains the organic peroxide (A) in an amount of not less than 50.0% by weight and not more than 90.0% by weight and the organic peroxide (B) in an amount of not less than 10.0% by weight and not more than 50.0% by weight, more preferably contains the organic peroxide (A) in an amount of not less than 60.0% by weight and not more than 85.0% by weight and the organic peroxide (B) in an amount of not less than 15.0% by weight and not more than 40.0% by weight, and still more preferably contains the organic peroxide (A) in an amount of not less than 65.0% by weight and not more than 80.0% by weight and the organic peroxide (B) in an amount of not less than 20.0% by weight and not more than 35.0% by weight, in a case where the total amount of the organic peroxide (A) and the organic peroxide (B) is regarded as 100% by weight. According to this arrangement, the abstraction of hydrogen and the crosslinking occur in an appropriately balanced manner in the melting and kneading step. This consequently brings about an advantage that the modified polypropylene resin having a low gel fraction and a sufficient melt tension is obtained.

<Kneader, Stirrer>

Melting and kneading carried out in the melting and kneading step indicate kneading, with use of a kneader, the random polypropylene resin, the conjugated diene compound, and the radical polymerization initiator at a temperature at which the random polypropylene resin can be melted. Kneading can be read as stirring. Therefore, a stirrer may be alternatively used.

Examples of a device which can be used in the melting and kneading step in accordance with one or more embodiments of the present invention include (a) kneaders such as a roller mill, a Ko-kneader, a Banbury mixer, a Brabender, a single screw extruder, and a twin screw extruder, (b) horizontal stirrers such as a twin screw surface renewal device and a twin screw multi-disk device, and (c) vertical stirrers such as a double helical ribbon stirrer. Out of these devices, any of the kneaders is preferably used, from the viewpoint of continuous kneading and scale-up. Out of the kneaders, an extruder is particularly preferably used, from the viewpoint of productivity.

In the melting and kneading step, it is only necessary that the random polypropylene resin, the conjugated diene compound, and the radical polymerization initiator are ultimately melted and kneaded. In other words, order in which the random polypropylene resin, the conjugated diene compound, and the radical polymerization initiator are mixed and kneaded is not limited to any particular one. Similarly, a method of mixing and kneading the random polypropylene resin, the conjugated diene compound, and the radical polymerization initiator is not limited to any particular one. For example, any of the following methods (a) through (d) can be employed;

(a) a method of mixing the random polypropylene resin, the conjugated diene compound, and the radical polymerization initiator to prepare a mixture and then melting and kneading the mixture;

(b) a method of melting and kneading the random polypropylene resin to prepare a melted and kneaded product of the random polypropylene resin, adding the conjugated diene compound and the radical polymerization initiator simultaneously to the melted and kneaded product of the random polypropylene resin, and then further melting and kneading a resultant mixture;

(c) a method of mixing, melting, and kneading the random polypropylene resin and the radical polymerization initiator, adding the conjugated diene compound to a resultant melted and kneaded product, and then further melting and kneading a resultant mixture; and (d) a method of melting and kneading the random polypropylene resin to prepare a melted and kneaded product of the random polypropylene resin, adding the conjugated diene compound and the radical polymerization initiator separately in random order to the melted and kneaded product of the random polypropylene resin and mixing a resultant mixture after each addition, and then further melting and kneading a resultant mixture.

In the melting and kneading step, a temperature of the kneader or the stirrer is not limited to any particular one, provided that the temperature is a temperature at which the random polypropylene resin can be melted.

In the melting and kneading step, the temperature of the kneader or the stirrer is preferably in a range of not less than 130° C. and not more than 300° C., more preferably in a range of not less than 145° C. and not more than 280° C., still more preferably in a range of not less than 160° C. and not more than 260° C., and particularly preferably in a range of not less than 175° C. and not more than 240° C. The temperature of the kneader is, for example, a temperature of a cylinder. A temperature of the resin in a kneading part or a stirring part is preferably not less than 130° C. and not more than 300° C. It is preferable that the temperature of the kneader or the stirrer and/or the temperature of the resin in the kneading part or the stirring part be arranged to fall within the above range(s), because (a) the random polypropylene resin is melted and is not thermally decomposed and (b) the radical polymerization initiator is sufficiently decomposed. In the melting and kneading step, a time for which the kneading is carried out is generally preferably 1 minute to 60 minutes.

The melted and kneaded product obtained in the melting and kneading step is extruded from a die provided to the kneader, and the melted and kneaded product thus extruded (also referred to as a strand) is cooled and chopped. This allows the modified polypropylene resin to be obtained. A method of cooling the strand is not limited to any particular one. For example, water cooling in which water is used can be employed. The strand may be chopped after being cooled or may be alternatively cooled and chopped simultaneously.

[3. Modified Polypropylene Resin]

A modified polypropylene resin in accordance with one or more embodiments of the present invention is a modified polypropylene resin in which a ratio (η30/η1) between an elongation viscosity η1 for an elongation time of 1 second and an elongation viscosity η30 for an elongation time of 30 seconds is not less than 40.0 and not more than 100.0, preferably not less than 40.0 and not more than 95.0, and more preferably not less than 40.0 and not more than 90.0. Note that each of the elongation viscosity η1 and the elongation viscosity η30 is measured at a temperature of 180° C. and a strain rate of 0.1/second.

Since the modified polypropylene resin in accordance with one or more embodiments of the present invention is arranged as described above, it is possible to provide, by an extrusion expansion method, expanded polypropylene-based resin particles having an expansion ratio which falls within a wide range and having a low open cell ratio.

It can be also said that, since the modified polypropylene resin in accordance with one or more embodiments of the present invention is arranged as described above, it is possible to provide, by an extrusion expansion method, expanded polypropylene-based resin particles having excellent moldability.

Specifically, since the modified polypropylene resin in accordance with one or more embodiments of the present invention is arranged as described above, the modified polypropylene resin has an excellent strain hardening property. The excellent strain hardening property of the modified polypropylene resin contributes to, in extruded expanded polypropylene-based resin particles obtained by an extrusion expansion method with use of the modified polypropylene resin, retaining cell membranes and sufficiently preventing a break of the cell membranes. As a result, the modified polypropylene resin in accordance with one or more embodiments of the present invention makes it possible to provide the extruded expanded polypropylene-based resin particles which have (a) a single crystallization peak in a DSC curve obtained by DSC, (b) an expansion ratio of not less than 2.0 times and less than 30.0 times, and (c) an open cell ratio of not less than 0.0% and not more than 20.0%.

Here, a method of measuring an elongation viscosity employed in this specification will be described below. A test piece is obtained by hot-pressing the modified polypropylene resin at 240° C. for 1 minute with use of a spacer having a length of 2 mm, a width of 1 mm, and a thickness of 1 mm. The test piece is set on a measuring device, and is then kept at 180° C. for 5 minutes. After that, the elongation viscosity is measured at an elongation rate of 0.1/second. As the measuring device, a viscoelasticity measuring device ARES available from TA Instruments is used.

A method for producing the modified polypropylene resin in accordance with one or more embodiments of the present invention is not limited to any particular one, and a conventionally publicly known method may be employed. The method for producing the modified polypropylene resin in accordance with one or more embodiments of the present invention is preferably the method described in the section [2. Method of producing modified polypropylene resin]. In other words, by using the method described in the section [2. Method of producing modified polypropylene resin], it is possible to produce the modified polypropylene resin in accordance with one or more embodiments of the present invention.

The modified polypropylene resin in accordance with one or more embodiments of the present invention contains a constitutional unit derived from a random polypropylene resin and a constitutional unit derived from a conjugated diene compound. An amount of an ethylene unit contained in the modified polypropylene resin in accordance with one or more embodiments of the present invention is more than 0.0% by weight and not more than 2.5% by weight, with respect to 100 parts by weight of the modified polypropylene resin. The modified polypropylene resin in accordance with one or more embodiments of the present invention can contain a constitutional unit derived from a radical polymerization initiator. The constitutional unit derived from the radical polymerization initiator, which constitutional unit is contained in the modified polypropylene resin in accordance with one or more embodiments of the present invention, can contain at least one kind of constitutional unit derived from an organic peroxide (A) and at least one kind of constitutional unit derived from an organic peroxide (B). Note, here, that the "constitutional unit derived from a radical polymerization initiator" or the "constitutional unit derived from an organic peroxide (A) (or organic peroxide (B))" indicates a constitutional unit derived from various substances generated by decomposition of the radical polymerization initiator or alternatively the organic peroxide (A) or the organic peroxide (B) during production of the modified polypropylene resin. As an aspect of each of the random polypropylene resin, the conjugated diene compound, and the radical polymerization initiator, the description given in the section [2. Method of producing modified polypropylene resin] is referred to as appropriate.

A shape and a size of the modified polypropylene resin in accordance with one or more embodiments of the present invention are not limited to any particular ones. The modified polypropylene resin may have, for example, a pellet-like shape.

According to the modified polypropylene resin in accordance with one or more embodiments of the present invention, when subjected to extraction in p-xylene at 130° C. for 6 hours with use of a metal gauze having a mesh size of 37 µm (400-mesh metal gauze), the modified polypropylene resin has a gel fraction of preferably not less than 0.5% by weight and not more than 1.5% by weight, more preferably not less than 0.5% by weight and not more than 1.0% by weight, and still more preferably not less than 0.5% by weight and not more than 0.8% by weight, with respect to 100% by weight of the modified polypropylene resin. In a case where the gel fraction of the modified polypropylene resin in accordance with one or more embodiments of the present invention is arranged as described above, it can be said that the modified polypropylene resin is one that has been obtained as a result of crosslinking having occurred at an appropriate frequency. Therefore, the modified polypropylene resin has the following advantages (a) and (b). That is, in a case where the extruded expanded polypropylene-based resin particles are produced by the extrusion expansion method with use of the modified polypropylene resin, (a) the modified polypropylene resin has a sufficient melt tension during expansion and (b) it is possible to prevent generation of gel. Note, here, that the "gel" is a gel-like (also referred to as jelly-like) foreign matter locally generated in the extruded expanded polypropylene-based resin particles due to excessive crosslinking, and can cause the break of the cell membranes in the extruded expanded polypropylene-based resin particles.

The gel fraction in this specification is measured with use of an instrument illustrated in FIG. 1. FIG. 1 is a schematic view illustrating instrumentation for measuring the gel fraction (hereinafter, referred to as a gel fraction measuring device). The gel fraction measuring device includes an eggplant-shaped flask 1, an oil bath device 3, and a stirrer 4. The eggplant-shaped flask 1 includes a stirrer piece 2 therein. The eggplant-shaped flask 1 is, for example, an eggplant-shaped flask having a capacity of 300 mL, and is a container in which the modified polypropylene resin and xylene are put. The eggplant-shaped flask 1 is set in the oil bath device 3 (in order to describe a configuration of the eggplant-shaped flask 1 in detail, FIG. 1 illustrates the eggplant-shaped flask 1 set above the oil bath device 3). The oil bath device 3 is a device for heating the modified polypropylene resin and the xylene put in the eggplant-shaped flask 1, and is set on the stirrer 4. The stirrer 4 is a device which allows the stirrer piece 2, included in the eggplant-shaped flask 1, to be rotated by a magnetic force. This makes it possible to stir the modified polypropylene resin and the xylene put in the eggplant-shaped flask 1. Note that arrows illustrated around the stirrer piece 2 indicate a direction in which the stirrer piece 2 is rotated (that is, a direction in which the modified polypropylene resin and the xylene put in the eggplant-shaped flask 1 are rotated). Note, however, that the direction in which the stirrer piece 2 is rotated is not limited to one illustrated in FIG. 1.

A method of measuring the gel fraction with use of the gel fraction measuring device is not limited to any particular one. For example, the gel fraction can be determined by sequentially carrying out the following steps (1) through (10) with use of the gel fraction measuring device.

(1) 0.5 g of the modified polypropylene resin is precisely weighed.

(2) The modified polypropylene resin precisely weighed in (1) is put in a 400-mesh metal gauze which has a bag shape and has a pleated side surface.

(3) The stirrer piece 2 and the 400-mesh metal gauze, in which the modified polypropylene resin is put in (2), are put in the eggplant-shaped flask 1 having a capacity of 300 mL, and 150 mL of xylene is further put in the eggplant-shaped flask 1.

(4) Stirring is carried out at 130° C. and 80 rpm for 1 hour with use of the oil bath device 3 and the stirrer 4.

(5) The xylene is completely replaced with new xylene, and then stirring is carried out for 1 hour.

(6) The xylene is completely replaced with new xylene, and then stirring is carried out for 4 hours.

(7) The 400-mesh metal gauze is taken out from eggplant-shaped flask 1 with use of tweezers, and washed with xylene so that matters adhering to the side surface of the 400-mesh metal gauze are removed.

(8) The resin remaining unmelted in the 400-mesh metal gauze is dried at 80° C. for 8 hours in a vacuum dryer in a state where this unmelted resin is put in the 400-mesh metal gauze.

(9) The unmelted resin is let to stand to cool down, and then a mass of the unmelted resin is measured in the state where the unmelted resin is put in the 400-mesh metal gauze.

(10) The gel fraction (% by weight) is calculated based on the following expression.

The gel fraction (% by weight)=a mass of the unmelted resin in the 400-mesh metal gauze (g)/a mass of the modified polypropylene resin (0.5 g)×100

Here, the mass of the unmelted resin in the 400-mesh metal gauze=a mass of the 400-mesh metal gauze which has been subjected to filtration and drying (including the unmelted resin)—a mass of only the 400-mesh metal gauze which has not been subjected to the filtration.

A melt tension at break (also merely referred to as a melt tension in this specification) of the modified polypropylene resin in accordance with one or more embodiments of the present invention is, at 200° C., preferably not more than 10.0 cN, more preferably not less than 3.0 cN and not more than 10.0 cN, still more preferably not less than 5.0 cN and not more than 10.0 cN, and still more preferably not less than 7.0 cN and not more than 10.0 cN. This arrangement causes the melt tension of the modified polypropylene resin to be sufficient during expansion, in a case where the extruded expanded polypropylene-based resin particles are produced by the extrusion expansion method with use of the modified polypropylene resin. This consequently brings about an advantage that it is possible to sufficiently retain the cell membranes in the extruded expanded polypropylene-based resin particles obtained.

A take-off speed at break (also merely referred to as a take-off speed in this specification) of the modified polypropylene resin in accordance one or more embodiments embodiment of the present invention is, at 200° C., preferably not less than 4.5 m/minute and not more than 6.0 m/minute, more preferably not less than 4.5 m/minute and not more than 5.8 m/minute, and still more preferably not less than 4.5 m/minute and not more than 5.5 m/minute. This arrangement brings about an advantage that a degree of elongation of the modified polypropylene resin during expansion is sufficient and is not excessive to retain the cell membranes, in a case where the extruded expanded polypropylene-based resin particles are produced by the extrusion expansion method with use of the modified polypropylene resin.

A method of measuring the melt tension in this specification and a method of measuring the take-off speed in this specification will be described below. The melt tension and the take-off speed are measured with use of a Capilograph 1D (available from Toyo Seiki Seisaku-sho, Ltd.) in this specification. Specifically, the melt tension and the take-off speed are measured as follows. A barrel which has a diameter of 9.55 mm and which is heated to a test temperature (for example, 200° C.) is filled with a sample resin (modified polypropylene resin) for measurement. Subsequently, the sample resin is heated to the test temperature (for example, 200° C.) for 10 minutes. Thereafter, while the sample resin is taken out in a strand shape from a capillary die (diameter: 1.0 mm, length: 10 mm) at a piston falling speed kept constant (10 mm/minute), this strand-like sample resin is caused to pass through a pulley which is for detecting a tension and which is located 350 mm below the capillary die, and then wound up on a wind-up roll. In so doing, this wind-up speed is increased from an initial speed of 1.0 m/minute to a speed of 200 m/minute at a rate at which the wind-up speed reaches the speed of 200 m/minute from the initial speed of 1.0 m/minute in 4 minutes. A load acting on the pulley, which is equipped with a load cell, at a time at which the strand-like sample resin breaks is regarded as the melt tension, and a value of the wind-up speed at the time at which the strand-like sample resin breaks is regarded as the take-off speed at break. In a case where the strand-like sample resin does not come to a breakage, the wind-up speed at a time point at which the load acting on the pulley ceased to increase even in a case where the wind-up speed was increased is regarded as the take-off speed. Note, here, that the fact that the strand-like sample resin does not come to a breakage means that the modified polypropylene resin does not have elasticity (crosslinking).

The melt tension at break of the modified polypropylene resin in accordance with one or more embodiments of the present invention is preferably not more than 10.0 cN at 200° C., and the take-off speed at break of the modified polypropylene resin is preferably not less than 4.5 m/minute and not more than 6.0 m/minute at 200° C.

[4. Method of Producing Extruded Expanded Polypropylene-Based Resin Particles]

A method of producing extruded expanded polypropylene-based resin particles in accordance with one or more embodiments of the present invention is a method including: a first step of producing an extruded expanded article by an extrusion expansion method with use of (a) a modified polypropylene resin obtained by the method described in the section [2. Method of producing modified polypropylene resin] or a modified polypropylene resin described in the section [3. Modified polypropylene resin] and (b) a carbonic acid gas serving as a blowing agent; and a second step of producing extruded expanded particles by cutting the extruded expanded article, obtained in the first step, in a particle shape.

Since the method of producing extruded expanded polypropylene-based resin particles in accordance with one or more embodiments of the present invention is arranged as described above, it is possible to provide, by an extrusion expansion method, expanded polypropylene-based resin particles having an expansion ratio which falls within a wide range and having a low open cell ratio.

It can be also said that, since the modified polypropylene resin in accordance with one or more embodiments of the present invention is arranged as described above, it is possible to provide, by an extrusion expansion method, expanded polypropylene-based resin particles having excellent moldability.

Specifically, the method of producing extruded expanded polypropylene-based resin particles in accordance with one or more embodiments of the present invention makes it possible to provide extruded expanded polypropylene-based resin particles which have (a) a single crystallization peak in a DSC curve obtained by DSC, (b) an expansion ratio of not less than 2.0 times and less than 30.0 times, and (c) an open cell ratio of not less than 0.0% and not more than 20.0%.

<First Step>

The first step will be described in detail. The first step is a step of producing an extruded expanded article by an extrusion expansion method by carrying out the following (1) and (2) in order: (1) a modified polypropylene resin and a blowing agent are fed into an extruder, and then melted and kneaded to obtain a melted and kneaded product; and (2) the melted and kneaded product thus obtained is cooled, and then extruded in a low-pressure region through a microporous die to obtain an extruded expanded article.

The extruded expanded article obtained in the first step is not limited to any particular shape, but preferably has a rod shape, because it is possible to easily obtain, by cutting in the second step, extruded expanded particles having a particle shape.

The microporous die is preferably a die from which it is possible to extrude the melted and kneaded product in the rod shape. The microporous die is not limited to any particular shape and number. A diameter of the microporous die preferably falls within a range of 0.1 mm to 2.0 mm. Note, here, that the diameter of the microporous die indicates a diameter of an inscribed circle inside the microporous die.

The blowing agent used in one or more embodiments of the present invention is a carbonic acid gas. An amount of the blowing agent used in the first step only needs to be adjusted as appropriate depending on a kind of the blowing agent so that an expansion ratio of targeted extruded expanded polypropylene-based resin particles is not less than 2.0 times and less than 30.0 times. The amount of the blowing agent used in the first step is preferably not less than 1.0 part by weight and not more than 20.0 parts by weight, and more preferably not less than 2.0 parts by weight and not more than 10.0 parts by weight, with respect to 100 parts by weight of the modified polypropylene resin.

In the first step, another blowing agent different from the carbonic acid gas may be further used in parts by weight less than that of the carbonic acid gas, provided that an effect of one or more embodiments of the present invention is not impaired. Examples of the another blowing agent, which is used in the first step and which is different from the carbonic acid gas, include (a) aliphatic hydrocarbon such as propane, normal butane, isobutane, normal pentane, isopentane, and hexane, (b) alicyclic hydrogen such as cyclopentane and cyclobutane, (c) inorganic gases such as air and nitrogen, and (d) water.

In the first step, a cell nucleating agent may be further used to control shapes of cells in the extruded expanded polypropylene-based resin particles. Examples of the cell nucleating agent include a sodium bicarbonate-citric acid mixture, monosodium citrate, talc, and calcium carbonate. Each of these cell nucleating agents may be used solely or two or more of these cell nucleating agents may be used in combination. An amount of the cell nucleating agent used in the first step is not limited to any particular one, and is usually preferably not less than 0.01 parts by weight and not more than 5.00 parts by weight, more preferably not less than 0.01 parts by weight and not more than 3.50 parts by weight, still more preferably not less than 0.01 parts by weight and not more than 1.00 part by weight, and particularly preferably not less than 0.01 parts by weight and not more than 0.50 parts by weight, with respect to 100 parts by weight of the modified polypropylene resin.

In the first step, (a) a stabilizer such as an antioxidant, a metal deactivator, a phosphorous processing stabilizer, an ultraviolet absorber, an ultraviolet stabilizer, a fluorescent brightening agent, metallic soap, and an antacid adsorbent and/or (b) an additive such as a crosslinking agent, a chain transfer agent, a nucleating agent, a lubricant, a plasticizer, a filler, a reinforcer, a pigment, a dye, a flame retarder, and an antistatic agent may be further used as necessary.

In one or more embodiments of the present invention, there is no restriction on use of a coloring agent. That is, in the first step, the extruded expanded article having a natural color can be obtained without use of any coloring agent. Alternatively, the extruded expanded article having a desired color can be obtained with use of a blue coloring agent, a red coloring agent, a black coloring agent, and/or the like. Examples of the coloring agent include a perylene-based organic pigment, an azo-based organic pigment, a quinacridone-based organic pigment, a phthalocyanine-based organic pigment, an indanthrene-based organic pigment, a dioxazine-based organic pigment, an isoindoline-based organic pigment, and carbon black.

<Second Step>

The second step is a step of producing extruded expanded particles by cutting the extruded expanded article, obtained in the first step, in a particle shape. Note that the phrase "cutting . . . in a particle shape" can be also read as "chopping". The extruded expanded particles obtained in the second step are extruded expanded polypropylene-based resin particles.

As a chopping method, that is, a cutting method in the second step, a cold cut method or a hot cut method is preferable.

Examples of the cold cut method include a strand cut method. The strand cut method is a method in which (i) a melted and kneaded product containing a blowing agent is expanded by extruding the melted and kneaded product to a low-pressure region through a microporous die so that an extruded expanded article is obtained, (ii) the extruded expanded article is taken while the extruded expanded article is cooled by causing the extruded expanded article to pass through a water tank, and then (iii) the extruded expanded article is chopped.

The hot cut method is a method in which a melted and kneaded product immediately after being extruded from a microporous die is cut with use of a cutter which rotates while being in contact with a die surface. The hot cut method is further classified into two methods, that is, an underwater cut method and a watering cut method, on the basis of a difference in cooling method. The underwater cut method is a method in which (i) a chamber attached to a leading end of a die is filled with a cooling medium, which is adjusted to have a predetermined pressure, so that the cooling medium is in contact with the die and (ii) a melted and kneaded product immediately after being extruded from the microporous die is cut in water. According to the watering cut method, a cooling drum, having an inner peripheral surface along which a cooling medium flows, is placed forward of a die. The watering cut method is a method in which a melted and kneaded product cut with use of a cutter is cooled by causing the melted and kneaded product to be in contact with the cooling medium while the melted and kneaded product is expanded or after the melted and kneaded product is expanded.

The cutting method in the second step can be selected as appropriate from the above-described cutting methods or any other cutting methods, for the purpose of obtaining extruded expanded particles having a low open cell ratio.

[5. Extruded Expanded Polypropylene-Based Resin Particles]

Extruded expanded polypropylene-based resin particles in accordance with one or more embodiments of the present invention are extruded expanded polypropylene-based resin particles which have a single crystallization peak in a DSC curve obtained by DSC, an expansion ratio of not less than 2.0 times and less than 30.0 times, and an open cell ratio of not less than 0.0% and not more than 20.0%.

Since the extruded expanded polypropylene-based resin particles in accordance with one or more embodiments of the present invention are arranged as described above, the extruded expanded polypropylene-based resin particles have an advantage that it is possible to provide an in-mold foamed molded polypropylene-based resin article which has good moldability and which have excellent characteristics of, for example, being formed in any shape, being shock-absorbing, being light in weight, and being heat insulating. As used herein, the term "moldability" indicates a property of the extruded expanded polypropylene-based resin particles and indicates ease of molding. The extruded expanded polypropylene-based resin particles having a low open cell ratio have excellent moldability. As used herein, the term "good moldability" indicates that it is easy to further expand the extruded expanded polypropylene-based resin particles and fuse the expanded particles together during in-mold foam molding, so that the in-mold foamed molded polypropylene-based resin article having a high expansion ratio can be easily obtained.

Furthermore, since the open cell ratio of the extruded expanded polypropylene-based resin particles in accordance with one or more embodiments of the present invention is arranged as described above, the extruded expanded polypropylene-based resin particles have advantages that (a) surfaces of the extruded expanded polypropylene-based resin particles are well elongated during in-mold foam molding, (b) the extruded expanded polypropylene-based resin particles are molded at a wide range of molding pressures during the in-mold foam molding, and (c) the in-mold foamed molded polypropylene-based resin article thus obtained less shrinks immediately after being molded. Note that, in this specification, the open cell ratio is measured by a measuring method described in Examples (later described).

Here, in this specification, the DSC curve of the extruded expanded polypropylene-based resin particles is a curve obtained by DSC after 5 mg to 6 mg of the extruded expanded polypropylene-based resin particles are heated from 40° C. to 220° C. at a rate of 10° C./minute.

A method for producing the extruded expanded polypropylene-based resin particles in accordance with one or more embodiments of the present invention is not limited to any particular one, and a conventionally publicly known method may be employed. The method for producing the extruded expanded polypropylene-based resin particles in accordance with one or more embodiments of the present invention is preferably the method described in the section [4. Method of producing extruded expanded polypropylene-based resin particles]. That is, the extruded expanded polypropylene-based resin particles in accordance with one or more embodiments of the present invention are preferably those produced by an extrusion expansion method with use of a modified polypropylene resin obtained by the method described in the section [2. Method of producing modified polypropylene resin] or a modified polypropylene resin described in the section [3. Modified polypropylene resin]. It can be also said that it is possible to produce the modified polypropylene resin in accordance with one or more embodiments of the present invention by the method described in the section [4. Method of producing extruded expanded polypropylene-based resin particles].

The extruded expanded polypropylene-based resin particles in accordance with one or more embodiments of the present invention have an expansion ratio of preferably not less than 2.0 times and less than 30.0 times, more preferably not less than 7.0 times and less than 27.0 times, still more preferably not less than 12.0 times and less than 25.0 times, and particularly preferably not less than 16.0 times and not more than 23.0 times. According to the above arrangement, the in-mold foamed molded polypropylene-based resin article obtained with use of the extruded expanded polypropylene-based resin particles has an advantage that characteristics of, for example, being formed in any shape, being shock-absorbing, being light in weight, and being heat insulating are more exhibited. In a case where the expansion ratio of the extruded expanded polypropylene-based resin particles does not reach the above range, a method of increasing the expansion ratio by pressuring insides of the extruded expanded polypropylene-based resin particles with use of an inert gas and heating the extruded expanded polypropylene-based resin particles (for example, a method disclosed in Japanese Patent Application Publication, Tokukaihei, No. 10-237212) can be further employed.

In this specification, the expansion ratio of the extruded expanded polypropylene-based resin particles is measured as follows. Any amount, falling within a range of not less than 3 g and not more than 10 g, of obtained extruded expanded polypropylene-based resin particles are weighed out, a weight w (g) is measured, and a volume v (cm³) is measured by a submersion method. An absolute specific gravity ρb of the extruded expanded polypropylene-based resin particles is calculated with use of the following expression: ρb=w/v. Then, an expansion ratio K is calculated from a ratio between a density ρr of the modified polypropylene resin particles which have not been expanded and the absolute specific gravity ρb of the extruded expanded polypropylene-based resin particles, with use of the following expression: K=ρr/ρb. Note that, in each of Examples and Comparative Examples below, the density ρr of the modified polypropylene resin particles which have not been expanded was set to 0.9 g/cm³.

The open cell ratio of the extruded expanded polypropylene-based resin particles in accordance with one or more embodiments of the present invention is preferably not less than 0.0% and not more than 20.0%, more preferably not less than 0.0% and not more than 19.0%, more preferably not less than 0.0% and not more than 18.0%, more preferably not less than 0.0% and not more than 17.0%, still more preferably not less than 0.0% and not more than 16.0%, and particularly preferably not less than 0.0% and not more than 15.0%. According to the above arrangement, the in-mold foamed molded polypropylene-based resin article obtained with use of the extruded expanded polypropylene-based resin particles has an advantage that characteristics of, for example, being formed in any shape, being shock-absorbing, being light in weight, and being heat insulating are more exhibited.

In this specification, it is possible to measure the open cell ratio of the extruded expanded polypropylene-based resin particles in accordance with a method described in PROSEDURE C of ASTM D2856-87, with use of an air comparison pycnometer [Model 1000, available from Tokyo Science Co., Ltd.]. In Examples (later described), a method of measuring the open cell ratio will be described in detail.

One or more embodiments of the present invention can be arranged as follows.

[1] A method of producing a modified polypropylene resin, the method including: a melting and kneading step of melting and kneading a random polypropylene resin, a conjugated diene compound, and a radical polymerization initiator to obtain a modified polypropylene resin, the random polypropylene resin containing an ethylene unit in an amount of more than 0.0% by weight and not more than 2.5% by weight with respect to 100 parts by weight of the random polypropylene resin, a melt flow rate (MFR) of the random polypropylene resin being not less than 5.0 g/10 minutes and not more than 20.0 g/10 minutes, an amount of the conjugated diene compound blended in the melting and kneading step being not less than 0.01 parts by weight and not more than 5.00 parts by weight with respect to 100 parts by weight of the random polypropylene resin, an amount of the radical polymerization initiator blended in the melting and kneading step being not less than 0.01 parts by weight and not more than 5.00 parts by weight with respect to 100 parts by weight of the random polypropylene resin, the radical polymerization initiator being a mixture containing at least one kind of organic peroxide (A) having a structure represented by the following General Formula (1) and at least one kind of organic peroxide (B) having at least one structure represented by the following General Formula (4) or (5), a ten-hour half-life temperature of each of the at least one kind of organic peroxide (A) and the at least one kind of organic peroxide (B) being 90° C. to 150° C.,

General Formula (1)

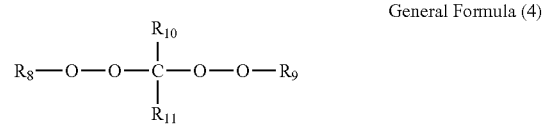

General Formula (4)

General Formula (5)

where: $R_1$, $R_8$, $R_9$, and $R_{13}$ are each independently hydrogen, a substituted or unsubstituted alkyl group having 1 to 8 carbon atoms, or a substituted or unsubstituted aryl group having 6 to 12 carbon atoms, and may be identical to or different from each other; $R_2$ is a substituted or unsubstituted alkyl group having 1 to 8 carbon atoms, a substituted or unsubstituted aryl group having 6 to 12 carbon atoms, or a substituted or unsubstituted alkoxy group having 1 to 8 carbon atoms; $R_{10}$ and $R_{11}$ (a) are each independently a substituted or unsubstituted alkyl group having 1 to 8 carbon atoms or a substituted or unsubstituted aryl group having 6 to 12 carbon atoms, and may be identical to or different from each other or (b) form a substituted or unsubstituted cycloalkyl group having 3 to 8 carbon atoms together; and $R_{12}$ is a substituted or unsubstituted alkyl group having 1 to 10 carbon atoms or a substituted or unsubstituted aryl group having 6 to 12 carbon atoms.

[2] The method described in [1], wherein, in a case where a total amount of the at least one kind of organic peroxide (A) and the at least one kind of organic peroxide (B) is regarded as 100% by weight, the mixture of the radical polymerization initiator contains the at least one kind of organic peroxide (A) in an amount of not less than 50.0% by weight and not more than 90.0% by weight and the at least one kind of organic peroxide (B) in an amount of not less than 10.0% by weight and not more than 50.0% by weight.

[3] A modified polypropylene resin in which a ratio ($\eta 30/\eta 1$) between an elongation viscosity $\eta 1$ for an elongation time of 1 second and an elongation viscosity $\eta 30$ for an elongation time of 30 seconds is not less than 40.0 and not more than 100.0, each of the elongation viscosity $\eta 1$ and the elongation viscosity $\eta 30$ being measured at a temperature of 180° C. and a strain rate of 0.1/second.

[4] The modified polypropylene resin described in [3], wherein when subjected to extraction in p-xylene at 130° C. for 6 hours with use of a metal gauze having a mesh size of 37 μm (400-mesh metal gauze), the modified polypropylene resin has a gel fraction of not less than 0.5% by weight and not more than 1.5% by weight with respect to 100% by weight of the modified polypropylene resin.

[5] The modified polypropylene resin described in [3] or [4], wherein a melt tension at break of the modified polypropylene resin is not more than 10.0 cN at a temperature of 200° C. and a take-off speed at break of the modified polypropylene resin is not less than 4.5 m/minute and not more than 6.0 m/minute at a temperature of 200° C.

[6] A method of producing extruded expanded polypropylene-based resin particles, the method including: a first step of producing an extruded expanded article by an extrusion expansion method with use of (a) a modified polypropylene resin obtained by a method described in [1] or [2] or a modified polypropylene resin described in any of [3] through [5] and (b) a carbonic acid gas serving as a blowing agent; and a second step of producing extruded expanded particles by cutting the extruded expanded article, obtained in the first step, in a particle shape.

[7] Extruded expanded polypropylene-based resin particles which have a single crystallization peak in a DSC curve obtained by DSC, an expansion ratio of not less than 2.0 times and less than 30.0 times, and an open cell ratio of not less than 0.0% and not more than 20.0%.

[8] The extruded expanded polypropylene-based resin particles described in [7], wherein the extruded expanded polypropylene-based resin particles have an expansion ratio of not less than 16.0 times and not more than 23.0 times.

One or more embodiments of the present invention can be arranged as follows.

[X1] A method of producing a modified polypropylene resin, the method including: a melting and kneading step of melting and kneading a random polypropylene resin, a conjugated diene compound, and a radical polymerization initiator to obtain a modified polypropylene resin, the random polypropylene resin containing an ethylene unit in an amount of more than 0.0% by weight and not more than 2.5% by weight with respect to 100 parts by weight of the random polypropylene resin, a melt flow rate (MFR) of the random polypropylene resin being not less than 5.0 g/10 minutes and not more than 20.0 g/10 minutes, an amount of the conjugated diene compound blended in the melting and kneading step being not less than 0.01 parts by weight and not more than 20.00 parts by weight with respect to 100 parts by weight of the random polypropylene resin, an amount of the radical polymerization initiator blended in the melting and kneading step being not less than 0.01 parts by weight and not more than 20.00 parts by weight with respect to 100 parts by weight of the random polypropylene resin, the radical polymerization initiator being a mixture containing at least one kind of organic peroxide (A) having at least one structure represented by the following General Formula (1), (2), or (3) and at least one kind of organic peroxide (B) having at least one structure represented by the following General Formula (4) or (5),

General Formula (1)

General Formula (2)

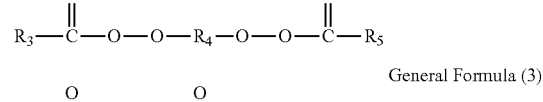

General Formula (3)

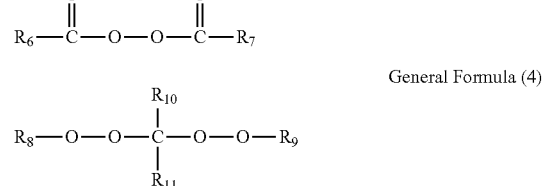

General Formula (4)

General Formula (5)

where: $R_1$, $R_8$, $R_9$, and $R_{13}$ are each independently hydrogen, a substituted or unsubstituted alkyl group having 1 to 12 carbon atoms, or a substituted or unsubstituted aryl group having 1 to 12 carbon atoms, and may be identical to or different from each other; $R_2$, $R_3$, and $R_5$ through $R_7$ are each independently a substituted or unsubstituted alkyl group having 1 to 12 carbon atoms, a substituted or unsubstituted aryl group having 1 to 12 carbon atoms, or a substituted or unsubstituted alkoxy group having 1 to 12 carbon atoms, and may be identical to or different from each other; $R_4$ is a substituted or unsubstituted alkylene group having 1 to 12 carbon atoms or a substituted or unsubstituted arylene group having 1 to 12 carbon atoms; $R_{10}$ and $R_{11}$ (a) are each independently a substituted or unsubstituted alkyl group having 1 to 12 carbon atoms or a substituted or unsubstituted aryl group having 1 to 12 carbon atoms, and may be identical to or different from each other or (b) form a substituted or unsubstituted cycloalkyl group having 3 to 12 carbon atoms together; and $R_{12}$ is a substituted or unsubstituted alkyl group having 1 to 12 carbon atoms or a substituted or unsubstituted aryl group having 1 to 12 carbon atoms.

[X2] The method described in [X1], wherein, in a case where a total amount of the at least one kind of organic peroxide (A) and the at least one kind of organic peroxide (B) is regarded as 100% by weight, the mixture of the radical polymerization initiator contains the at least one kind of organic peroxide (A) in an amount of not less than 50.0% by weight and not more than 80.0% by weight and the at least one kind of organic peroxide (B) in an amount of not less than 20.0% by weight and not more than 50.0% by weight.

[X3] A modified polypropylene resin in which a ratio (η30/η1) between an elongation viscosity η1 for an elongation time of 1 second and an elongation viscosity η30 for an elongation time of 30 seconds is not less than 40.0 and not more than 100.0, each of the elongation viscosity η1 and the elongation viscosity η30 being measured at a temperature of 180° C. and a strain rate of 0.1/second.

[X4] The modified polypropylene resin described in [X3], wherein when subjected to extraction in p-xylene at 130° C. for 6 hours with use of a metal gauze having a mesh size of 37 μm (400-mesh metal gauze), the modified polypropylene resin has a gel fraction of not less than 0.5% by weight and not more than 1.5% by weight with respect to 100% by weight of the modified polypropylene resin.

[X5] The modified polypropylene resin described in [X3] or [X4], wherein a melt tension at break of the modified polypropylene resin is not more than 10.0 cN at a temperature of 200° C. and a take-off speed at break of the modified polypropylene resin is not less than 4.5 m/minute and not more than 6.0 m/minute at a temperature of 200° C.

[X6] A method of producing extruded expanded polypropylene-based resin particles, the method including: a first step of producing an extruded expanded article by an extrusion expansion method with use of (a) a modified polypropylene resin obtained by a method described in [X1] or [X2] or a modified polypropylene resin described in any of [X3] through [X5] and (b) a carbonic acid gas serving as a blowing agent; and a second step of producing extruded expanded particles by cutting the extruded expanded article, obtained in the first step, in a particle shape.

[X7] Extruded expanded polypropylene-based resin particles which have a single crystallization peak in a DSC curve obtained by DSC, an expansion ratio of not less than 2.0 times and less than 30.0 times, and an open cell ratio of not less than 0.0% and not more than 20.0%.

[X8] The extruded expanded polypropylene-based resin particles described in [X7], wherein the extruded expanded polypropylene-based resin particles have an expansion ratio of not less than 16.0 times and not more than 23.0 times.

EXAMPLES

One or more embodiments of the present invention will be described below in more detail with reference to Examples. Note, however, that one or more embodiments of the present invention are not limited to such Examples.

Raw materials and devices used in Examples and Comparative Examples are as follows.

<Random Polypropylene Resin>
  PP-1: ethylene random copolymer containing 2.0% ethylene (MFR: 7.0 g/10 minutes, melting point: 144° C.)
  PP-2: ethylene random copolymer containing 2.8% ethylene (MFR: 7.5 g/10 minutes, melting point: 144° C.)
  PP-3: ethylene random copolymer containing 2.3% ethylene (MFR: 22.0 g/10 minutes. melting point: 144° C.)
  PP-4: ethylene random copolymer containing 2.7% ethylene (MFR: 2.3 g/10 minutes, melting point: 144° C.)

<Radical Polymerization Initiator>
Organic Peroxide (A)
  t-butyl peroxyisopropylmonocarbonate
Organic Peroxide (B)
  2,2-di(t-butyl peroxy)butane
  2,2-di(t-amyl peroxy)butane
  p-menthane-hydroperoxide Table 1 collectively shows aspects of the organic peroxide (A) and the organic peroxide (B), that is, the radical polymerization initiator used to produce a modified polypropylene resin. In a column "General formula" in Table 1, a general formula of the organic peroxide (A) or the organic peroxide (B) is shown. In a column "Carbon number (number of carbon atoms)" in Table 1, the number of carbon atoms in a functional group in each R in the general formula is shown.

TABLE 1

| | Kind | Ten-hour half-life temperature (° C.) | General Formula | Carbon number (number of carbon atoms) | | | |
|---|---|---|---|---|---|---|---|
| Organic peroxide (A) | t-butyl peroxyisopropylmonocarbonate | 98.7 | General Formula (1) | $R_1 = 4$ | $R_2 = 3$ | — | — |
| Organic peroxide (B) | 2,2-di(t-butyl peroxy)butane | 103 | General Formula (4) | $R_8 = 4$ | $R_9 = 4$ | $R_{10} = 1$ | $R_{11} = 2$ |
| | 2,2-di(t-amyl peroxy)butane | 97 | General Formula (4) | $R_8 = 5$ | $R_9 = 5$ | $R_{10} = 1$ | $R_{11} = 2$ |
| | p-menthane-hydroperoxide | 128 | General Formula (5) | $R_{12} = 10$ | $R_{13} = 0$ | — | — |

(Production of Modified Polypropylene Resin)

As Examples 1 through 5 and Comparative Examples 1 through 8, modified polypropylene resins MP-1 through MP-13 were produced. Raw materials of each of MP-1 through MP-13 are as follows. As a random polypropylene resin, one that is shown in a row "Kind" in an item "Random polypropylene resin" in Table 2 was used. An amount of an ethylene unit contained in the random polypropylene resin used was an amount shown in a row "Amount of ethylene unit contained" in Table 2, with respect to 100 parts by weight of the random polypropylene resin. As a radical polymerization initiator, a mixture containing t-butyl peroxyisopropylmonocarbonate as an organic peroxide (A) and 2,2-di(t-butyl peroxy)butane, 2,2-di(t-amyl peroxy)butane, or p-menthane-hydroperoxide as an organic peroxide (B) was used. The mixture of the radical polymerization initiator was adjusted so that, in a case where a total amount of the organic peroxide (A) and the organic peroxide (B) contained in the mixture was regarded as 100% by weight, the mixture contained the organic peroxide (A) in a proportion shown in a row "Proportion of organic peroxide (A)" in Table 2, and contained the organic peroxide (B) in a proportion shown in a row "Proportion of organic peroxide (B)" in Table 2. As a conjugated diene compound, isoprene (isoprene monomer) was used.

The modified polypropylene resin MP-1, which was Example 1, was produced by the following method: (1) 100 parts by weight of the random polypropylene resin and 1.4 parts by weight of the mixture of the radical polymerization initiator, with respect to 100 parts by weight of the random polypropylene resin, were fed to a twin screw extruder*having a diameter of 45 mmφ through a hopper at 70 kg/hour; (2) these raw materials thus fed were melted and kneaded at a cylinder temperature of 200° C. and a rotation speed of 230 rpm; (3) in the middle of (2), 0.86 parts by weight of the conjugated diene compound, with respect to 100 parts by weight of the random polypropylene resin, was fed to the twin screw extruder through an injection section provided in midstream of the twin screw extruder, and the raw materials thus fed were melted and kneaded in the twin screw extruder to obtain a melted and kneaded product; and (4) the melted and kneaded product was extruded from a die, and the melted and kneaded product thus extruded (strand) was cooled with water and chopped to obtain a modified polypropylene resin.

Examples 2 through 5 and Comparative Examples 1 through 8: each of the modified polypropylene resins MP-2 through MP-13 was obtained in a way similar to that of obtaining the modified polypropylene resin MP-1, except that composition shown in Table 2 was employed.

Obtained MP-1 through MP-13 were subjected to measurement of (a) a ratio ($\eta 30/\eta 1$) between an elongation viscosity $\eta 1$ for an elongation time of 1 second and an elongation viscosity $\eta 30$ for an elongation time of 30 seconds, (b) a gel fraction, (c) a melt tension at break (melt tension), and (d) a take-off speed at break (take-off speed), by the respective above-described methods.

Note that each of the modified polypropylene resins MP-11 through MP-13, which were Comparative Examples 6 through 8, respectively, was not so elastic as to allow an elongation viscosity to be measured and, therefore, each of the modified polypropylene resins MP-11 through MP-13 was evaluated as "unmeasurable" in terms of $\eta 30/\eta 1$. Note also that each of the modified polypropylene resins MP-11 through MP-13, which were Comparative Examples 6 through 8, respectively, did not break even if each of the modified polypropylene resins MP-11 through MP-13 continued to be wound up at a speed of 200 m/minute, which was an upper limit measurable by a measuring apparatus. Since it could not be said that 200 m/minute, which was the upper limit measurable by the measuring apparatus, was the take-off speed of each of the modified polypropylene resins MP-11 through MP-13, each of the modified polypropylene resins MP-11 through MP-13 was evaluated as "unmeasurable" in terms of the take-off speed and the melt tension.

Table 2 shows (i) physical properties of the random polypropylene resin used to obtain each of the modified polypropylene resins MP-1 through MP-5, which were Examples 1 through 5, respectively, and the modified polypropylene resins MP-6 through MP-13, which were Comparative Examples 1 to 8, respectively, (ii) amounts of the raw materials used to obtain each of the modified polypropylene resins MP-1 through MP-13, and (ii) physical properties of each of the modified polypropylene resins MP-1 through MP-13 obtained.

TABLE 2

|  |  |  |  | Examples |  |  |  |  | Comparative Examples |  |
|---|---|---|---|---|---|---|---|---|---|---|
|  |  |  |  | 1 | 2 | 3 | 4 | 5 | 1 | 2 |
| Modified polypropylene resin |  | Kind | — | MP-1 | MP-2 | MP-3 | MP-4 | MP-5 | MP-6 | MP-7 |
| Raw materials | Random polypropylene resin | Kind | — | PP-1 | PP-1 | PP-1 | PP-1 | PP-1 | PP-1 | PP-2 |
|  |  | Blended amount | Parts by weight | 100 | 100 | 100 | 100 | 100 | 100 | 100 |
|  |  | MFR | g/10 minutes | 7.0 | 7.0 | 7.0 | 7.0 | 7.0 | 7.0 | 7.5 |
|  |  | Amount of ethylene unit contained | % by weight | 2.0 | 2.0 | 2.0 | 2.0 | 2.0 | 2.0 | 2.8 |
|  | Radical polymerization initiator | Blended amount | Parts by weight | 1.40 | 1.25 | 0.90 | 1.40 | 1.40 | 1.40 | 1.14 |
|  |  | Proportion of organic peroxide (A) | % by weight | 66.7 | 66.7 | 80.0 | 66.7 | 80.0 | 100.0 | 66.7 |
|  |  | Proportion of organic peroxide (B) | % by weight | 33.3 | 33.3 | 20.0 | 33.3 | 20.0 | 0.0 | 33.3 |
|  | Conjugated diene compound | Blended amount | Parts by weight | 0.86 | 0.81 | 0.58 | 0.73 | 0.78 | 0.60 | 0.60 |
| Physical properties of modified polypropylene resin | Ratio ($\eta 30/\eta 1$) between elongation viscosity $\eta 1$ for elongation time of 1 second and elongation viscosity $\eta 30$ for elongation time of 30 seconds | — |  | 40.6 | 55.3 | 65.0 | 52.4 | 94.6 | 29.0 | 1.6 |
|  | Gel fraction |  | % | 0.9 | 0.9 | 0.6 | 0.9 | 2.6 | 4.9 | 0.7 |
|  | Melt tension |  | cN | 9.6 | 10.6 | 10.2 | 8.6 | 10.3 | 6.5 | 7.7 |
|  | Take-off speed |  | m/minute | 5.5 | 4.6 | 4.6 | 5.4 | 4.0 | 5.7 | 8.5 |

|  |  |  |  | Comparative Examples |  |  |  |  |  |
|---|---|---|---|---|---|---|---|---|---|
|  |  |  |  | 3 | 4 | 5 | 6 | 7 | 8 |
| Modified polypropylene resin |  | Kind | — | MP-8 | MP-9 | MP-10 | MP-11 | MP-12 | MP-13 |
| Raw materials | Random polypropylene resin | Kind | — | PP-3 | PP-4 | PP-2 | PP-2 | PP-2 | PP-2 |
|  |  | Blended amount | Parts by weight | 100 | 100 | 100 | 100 | 100 | 100 |
|  |  | MFR | g/10 minutes | 22.0 | 2.3 | 7.5 | 7.5 | 7.5 | 7.5 |
|  |  | Amount of ethylene unit contained | % by weight | 2.3 | 2.7 | 2.8 | 2.8 | 2.8 | 2.8 |

TABLE 2-continued

|  |  |  |  |  |  |  |  |  |  |
|---|---|---|---|---|---|---|---|---|---|
|  | Radical polymerization initiator | Blended amount | Parts by weight | 1.10 | 1.00 | 1.10 | 1.10 | 0.70 | 0.70 |
|  |  | Proportion of organic peroxide (A) | % by weight | 66.7 | 66.7 | 100.0 | 0.0 | 0.0 | 0.0 |
|  |  | Proportion of organic peroxide (B) | % by weight | 33.3 | 33.3 | 0.0 | 100.0 | 100.0 | 100.0 |
|  | Conjugated diene compound | Blended amount | Parts by weight | 0.83 | 0.50 | 0.55 | 0.90 | 0.60 | 1.15 |
| Physical properties of modified polypropylene resin | Ratio ($\eta 30/\eta 1$) between elongation viscosity $\eta 1$ for elongation time of 1 second and elongation viscosity $\eta 30$ for elongation time of 30 seconds | — |  | 38.8 | 39.0 | 39.5 | Unmeasurable | Unmeasurable | Unmeasurable |
|  | Gel fraction |  | % | 0.5 | 0.3 | 13.9 | 0.0 | 0.8 | 0.0 |
|  | Melt tension |  | cN | 7.6 | 9.4 | 8.8 | Unmeasurable | Unmeasurable | Unmeasurable |
|  | Take-off speed |  | m/minute | 5.9 | 9.2 | 4.0 | Unmeasurable | Unmeasurable | Unmeasurable |

(Production of Extruded Expanded Polypropylene-Based Resin Particles)

Example 1

Extruded expanded polypropylene-based resin particles of Example 1 were produced by the following method: (1) (a) 100 parts by weight of the modified polypropylene resin shown in Table 3 and (b) 0.02 parts by weight of Talcan PK-S (available from Hayashi-Kasei Co., Ltd.), serving as a cell nucleating agent, with respect to 100 parts by weight of the modified polypropylene resin were blended in a tumbler to prepare a blended product, and then the blended product was fed to a twin screw extruder having a diameter of 15 mm; (2) after the blended product was melted in the twin screw extruder set at 200° C., 5 parts by weight of a carbonic acid gas, serving as a blowing agent, with respect to 100 parts by weight of the modified polypropylene resin was injected into and mixed with the blended product thus melted to prepare a melted resin product; (3) the melted resin product was cooled in a static mixer set at 146° C.; and (4) thereafter, the melted resin product was expanded by extruding the melted resin product from a die provided with a single micropore having a diameter of 0.7 mm, under an atmospheric pressure (to a low-pressure region) at a discharge rate of 1 kg/hour. As a result, an extruded expanded article was obtained. The extruded expanded article thus obtained was cut in a particle shape to obtain extruded expanded polypropylene-based resin particles having an expansion ratio of 18.3 times and an open cell ratio of 13.3%. Table 3 shows results. Note, here, that the expansion ratio was measured by the above-described method.

Note, here, that the open cell ratio was measured by the following method. With use of an air comparison pycnometer [Model 1000, available from Tokyo Science Co., Ltd.], a volume Vc (cm$^3$) of the extruded expanded polypropylene-based resin particles obtained was measured in accordance with a method described in PROSEDURE C of ASTM D2856-87. Next, the whole extruded expanded polypropylene-based resin particles whose Vc had been measured were submerged in ethanol in a graduated cylinder. Subsequently, an apparent volume Va (cm$^3$) of the extruded expanded polypropylene-based resin particles was determined from how much a position of the ethanol in the graduated cylinder was risen (that is, by these methods also referred to as a submersion method). The open cell ratio of the extruded expanded polypropylene-based resin particles was calculated by the following expression:

The open cell ratio (%)=(Va−Vc)×100/Va.

Examples 2 Through 5 and Comparative Examples 1 Through 5

Extruded expanded polypropylene-based resin particles of each of Examples 2 through 5 and Comparative Examples 1 through 5 were produced in a way similar to that in Example 1, except that the modified polypropylene resin shown in Table 3 was used as a modified polypropylene resin. However, in Example 4, an amount of a carbonic acid gas used as a blowing agent was set to 2.5 parts by weight with respect to 100 parts by weight of the modified polypropylene resin.

The expansion ratio and the open cell ratio of the extruded expanded polypropylene-based resin particles obtained in each of Examples 1 through 5 and Comparative Examples 1 through 5 were measured by the respective above-described methods. Table 3 shows results.

TABLE 3

|  |  |  |  | Examples | | | | | Comparative Examples | | | | |
|---|---|---|---|---|---|---|---|---|---|---|---|---|---|
|  |  |  |  | 1 | 2 | 3 | 4 | 5 | 1 | 2 | 3 | 4 | 5 |
| Raw materials | Modified polypropylene resin | Kind | — | MP-1 | MP-2 | MP-3 | MP-4 | MP-5 | MP-6 | MP-7 | MP-8 | MP-9 | MP-10 |
|  |  | Blended amount | Parts by weight | 100 | 100 | 100 | 100 | 100 | 100 | 100 | 100 | 100 | 100 |
|  | Cell nucleating agent | Blended amount | Parts by weight | 0.02 | 0.02 | 0.02 | 0.02 | 0.02 | 0.02 | 0.02 | 0.02 | 0.02 | 0.02 |
|  | Blowing agent | Blended amount | Parts by weight | 5.0 | 5.0 | 5.0 | 2.5 | 5.0 | 5.0 | 5.0 | 5.0 | 5.0 | 5.0 |

TABLE 3-continued

| | | | Examples | | | | | Comparative Examples | | | | |
|---|---|---|---|---|---|---|---|---|---|---|---|---|
| | | | 1 | 2 | 3 | 4 | 5 | 1 | 2 | 3 | 4 | 5 |
| Physical properties of extruded expanded polypropylene-based resin particles | Expansion ratio | Times | 18.3 | 20.5 | 20.0 | 7.7 | 18.9 | 19.1 | 18.8 | 18.9 | 22.1 | 17.8 |
| | Open cell ratio | % | 13.3 | 18.6 | 18.4 | 15.5 | 19.0 | 43.9 | 40.7 | 41.0 | 74.5 | 43.5 |

The following are found from Table 3. The extruded expanded polypropylene-based resin particles of Examples 1 through 5 were produced with use of MP-1 through MP-5 as modified polypropylene resins. The modified polypropylene resins MP-1 through MP-5 are modified polypropylene resins produced by the method of producing a modified polypropylene resin in accordance with one or more embodiments of the present invention. Therefore, according to each of the modified polypropylene resins MP-1 through MP-5, the ratio (η30/η1) between the elongation viscosity ill for the elongation time of 1 second and the elongation viscosity η30 for the elongation time of 30 seconds was within the scope of one or more embodiments of the present invention. The expansion ratio of the extruded expanded polypropylene-based resin particles of each of Examples 1 through 5, which particles were produced with use of such a modified polypropylene resin, was not less than 2.0 times and less than 30.0 times, and the open cell ratio of the extruded expanded polypropylene-based resin particles of each of Examples 1 through 5 was not less than 0.0% and not more than 20.0%.

The gel fraction of MP-1, which was used to produce the extruded expanded polypropylene-based resin particles of Example 1, was not less than 0.5% by weight and not more than 1.5% by weight, the melt tension of MP-1 was not more than 10.0 cN, and the take-off speed of MP-1 was not less than 4.5 m/minute and not more than 6.0 m/minute. The open cell ratio of the extruded expanded polypropylene-based resin particles of Example 1 was the lowest among Examples and Comparative Examples.

The extruded expanded polypropylene-based resin particles of Example 2 were produced with use of MP-2, whose melt tension was higher than that of MP-1 and was higher than 10 cN. However, the open cell ratio of the extruded expanded polypropylene-based resin particles of Example 2 remained slightly increased as compared to the extruded expanded polypropylene-based resin particles of Example 1.

The extruded expanded polypropylene-based resin particles of Example 3 were produced with use of MP-3, whose melt tension was higher than that of MP-1 and was higher than 10 cN. Furthermore, MP-3 was produced under a condition that a proportion of the organic peroxide (A) was higher than that of the organic peroxide (A) in MP-1. However, the open cell ratio of the extruded expanded polypropylene-based resin particles of Example 3 remained slightly increased as compared to the extruded expanded polypropylene-based resin particles of Example 1.

The gel fraction of MP-4, used to produce the extruded expanded polypropylene-based resin particles of Example 4, was not less than 0.5% by weight and not more than 1.5% by weight, the melt tension of MP-4 was not more than 10.0 cN, and the take-off speed of MP-4 was not less than 4.5 m/minute and not more than 6.0 m/minute. The expansion ratio of the extruded expanded polypropylene-based resin particles of Example 4 was lower than that of the extruded expanded polypropylene-based resin particles of Example 1 because, in Example 4, the amount of the blowing agent (carbonic acid gas) was reduced. The open cell ratio of the extruded expanded polypropylene-based resin particles of Example 4 was slightly increased as compared to the extruded expanded polypropylene-based resin particles of Example 1, but was lower than that of the extruded expanded polypropylene-based resin particles of each of Examples 2 and 3.

The open cell ratio of the extruded expanded polypropylene-based resin particles of Example 5 was the highest among Examples 1 through 5. The extruded expanded polypropylene-based resin particles of Example 5 were produced with use of MP-5. The gel fraction of MP-5 was higher than that of the extruded expanded polypropylene-based resin particles of Example 1, and was 2.6% by weight. Furthermore, the melt tension of MP-5 was higher than 10 cN, and the take-off speed of MP-5 was less than 4.5.

The extruded expanded polypropylene-based resin particles of Comparative Examples 1 through 5 were produced with use of MP-6 through MP-10 as modified polypropylene resins. The modified polypropylene resins MP-6 through MP-10 are modified polypropylene resins produced by a method outside the scope of one or more embodiments of the present invention. Therefore, according to each of the modified polypropylene resins MP-6 through MP-10, the ratio (η30/η1) between the elongation viscosity η1 for the elongation time of 1 second and the elongation viscosity η30 for the elongation time of 30 seconds was outside the scope of one or more embodiments of the present invention. The open cell ratio of the extruded expanded polypropylene-based resin particles of each of Comparative Examples 1 through 5, which particles were produced with use of such a modified polypropylene resin, was much higher than that of the extruded expanded polypropylene-based resin particles of each of Examples 1 through 5. It is clear that it can be inferred that the extruded expanded polypropylene-based resin particles obtained in each of Examples have more excellent in-mold moldability.

INDUSTRIAL APPLICABILITY

According to one or more embodiments of the present invention, it is possible to obtain a modified polypropylene resin which makes it possible to provide, by an extrusion expansion method, expanded polypropylene-based resin particles having an expansion ratio which falls within a wide range and having a low open cell ratio. Therefore, one or more embodiments of the present invention can be suitably used to obtain an in-mold foamed molded polypropylene-based resin article which has excellent characteristics of, for example, being formed in any shape, being shock-absorbing, being light in weight, and being heat insulating. Therefore, one or more embodiments of the present invention can be suitably used in the fields of automotive interior materials, cushioning materials, packaging materials, heat insulating materials, and the like.

Although the disclosure has been described with respect to only a limited number of embodiments, those skilled in the art, having benefit of this disclosure, will appreciate that various other embodiments may be devised without departing from the scope of one or more embodiments of the present invention. Accordingly, the scope of one or more embodiments should be limited only by the attached claims.

The invention claimed is:

1. A method of producing extruded polypropylene-based resin particles, the method comprising:
a first step of producing an extruded expanded article by an extrusion expansion method with (a) a modified polypropylene resin and (b) a carbonic acid gas serving as a blowing agent; and
a second step of producing extruded expanded particles by cutting the extruded expanded article, obtained in the first step, in a particle shape,
wherein the (a) modified polypropylene resin is obtained by melting and kneading a random polypropylene resin, a conjugated diene compound, and a radical polymerization initiator to obtain a modified polypropylene resin,
the random polypropylene resin containing an ethylene unit in an amount of more than 0.0% by weight and not more than 2.5% by weight with respect to 100 parts by weight of the random polypropylene resin, and wherein the random polypropylene resin has a melt flow rate (MFR) of not less than 5.0 g/10 minutes and not more than 20.0 g/10 minutes,
the conjugated diene compound blended in the melting and kneading comprises not less than 0.01 parts by weight and not more than 5.00 parts by weight with respect to 100 parts by weight of the random polypropylene resin,
the radical polymerization initiator blended in the melting and kneading comprises not less than 0.01 parts by weight and not more than 5.00 parts by weight with respect to 100 parts by weight of the random polypropylene resin,
wherein the radical polymerization initiator is a mixture containing at least one kind of organic peroxide (A) having a structure represented by the following Formula (1) and at least one kind of organic peroxide (B) having at least one structure represented by the following Formula (4) or (5),
wherein each of the at least one kind of organic peroxide (A) and the at least one kind of organic peroxide (B) have a ten-hour half-life temperature of 90° C. to 150° C.,

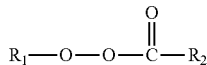
Formula (1)

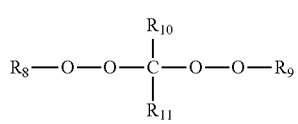
Formula (4)

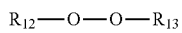
Formula (5)

where: $R_1$, $R_8$, $R_9$, and $R_{13}$ are each independently hydrogen, a substituted or unsubstituted alkyl group having 1 to 8 carbon atoms, or a substituted or unsubstituted aryl group having 6 to 12 carbon atoms, and are optionally identical to or different from each other;
$R_2$ is a substituted or unsubstituted alkyl group having 1 to 8 carbon atoms, a substituted or unsubstituted aryl group having 6 to 12 carbon atoms, or a substituted or unsubstituted alkoxy group having 1 to 8 carbon atoms;
$R_{10}$ and $R_{11}$ (a) are each independently a substituted or unsubstituted alkyl group having 1 to 8 carbon atoms or a substituted or unsubstituted aryl group having 6 to 12 carbon atoms, and are optionally identical to or different from each other or (b) form a substituted or unsubstituted cycloalkyl group having 3 to 8 carbon atoms together; and
$R_{12}$ is a substituted or unsubstituted alkyl group having 1 to 10 carbon atoms or a substituted or unsubstituted aryl group having 6 to 12 carbon atoms, and
wherein when subjected to extraction in p-xylene at 130° C. for 6 hours with use of a metal gauze having a mesh size of 37 μm (400-mesh metal gauze), the modified polypropylene resin has a gel fraction of not less than 0.5% by weight and not more than 1.5% by weight with respect to 100% by weight of the modified polypropylene resin.

2. The method according to claim 1, wherein, in a case where a total amount of the at least one kind of organic peroxide (A) and the at least one kind of organic peroxide (B) is regarded as 100% by weight, the mixture of the radical polymerization initiator contains the at least one kind of organic peroxide (A) in an amount of not less than 50.0% by weight and not more than 90.0% by weight and the at least one kind of organic peroxide (B) in an amount of not less than 10.0% by weight and not more than 50.0% by weight.

3. The method according to claim 1, wherein the amount of the conjugated diene compound blended in the melting and kneading is not less than 0.30 parts by weight and not more than 2.00 parts by weight with respect to 100 parts by weight of the random polypropylene resin.

4. The method according to claim 1, wherein the amount of the radical polymerization initiator blended in the melting and kneading is not less than 0.50 parts by weight and not more than 2.00 parts by weight with respect to 100 parts by weight of the random polypropylene resin.

5. A method of producing extruded poly-propylene-based resin particles, the method comprising:
a first step of producing an extruded expanded article by an extrusion expansion method with (a) a modified polypropylene resin and (b) a carbonic acid gas serving as a blowing agent; and
a second step of producing extruded expanded particles by cutting the extruded expanded article, obtained in the first step, in a particle shape,
wherein the (a) modified polypropylene resin is obtained by melting and kneading a random polypropylene resin, a conjugated diene compound, and a radical polymerization initiator to obtain a modified polypropylene resin,
the random polypropylene resin containing an ethylene unit in an amount of more than 0.0% by weight and not more than 2.5% by weight with respect to 100 parts by weight of the random polypropylene resin, and wherein the random polypropylene resin has a melt flow rate (MFR) of not less than 5.0 g/10 minutes and not more than 20.0 g/10 minutes, the conjugated diene compound blended in the melting and kneading comprises not less than 0.01 parts by weight and not more than 5.00 parts by weight with respect to 100 parts by weight of the random polypropylene resin, the radical polymerization initiator blended in the melting and kneading comprises not less than 0.01 parts by weight and not more than 5.00 parts by weight with respect to 100 parts by weight of the random polypropylene resin, wherein the radical polymerization initiator is a mixture containing at least one kind of organic peroxide (A) having a structure represented by the following Formula (1) and at least one kind of organic peroxide (B) having at least one structure represented by the following Formula (4) or (5), wherein each of the at least one kind of organic peroxide (A) and the at least one kind of organic peroxide (B) have a ten-hour half-life temperature of 90° C. to 150° C.,

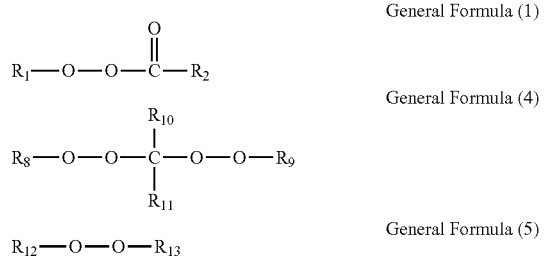

where: $R_1$, $R_8$, $R_9$, and $R_{13}$ are each independently hydrogen, a substituted or unsubstituted alkyl group having 1 to 8 carbon atoms, or a substituted or unsubstituted aryl group having 6 to 12 carbon atoms, and are optionally identical to or different from each other;

$R_2$ is a substituted or unsubstituted alkyl group having 1 to 8 carbon atoms, a substituted or unsubstituted aryl group having 6 to 12 carbon atoms, or a substituted or unsubstituted alkoxy group having 1 to 8 carbon atoms;

$R_{10}$ and $R_{11}$ (a) are each independently a substituted or unsubstituted alkyl group having 1 to 8 carbon atoms or a substituted or unsubstituted aryl group having 6 to 12 carbon atoms, and are optionally identical to or different from each other or (b) form a substituted or unsubstituted cycloalkyl group having 3 to 8 carbon atoms together; and $R_{12}$ is a substituted or unsubstituted alkyl group having 1 to 10 carbon atoms or a substituted or unsubstituted aryl group having 6 to 12 carbon atoms, wherein a melt tension at break of the modified polypropylene resin is not more than 10.0 cN at a temperature of 200° C. and a take-off speed at break of the modified polypropylene resin is not less than 4.5 m/minute and not more than 6.0 m/minute at a temperature of 200° C., and wherein when subjected to extraction in p-xylene at 130° C. for 6 hours with use of a metal gauze having a mesh size of 37 μm (400-mesh metal gauze), the modified polypropylene resin has a gel fraction of not less than 0.5% by weight and not more than 1.5% by weight with respect to 100% by weight of the modified polypropylene resin.

6. A method of producing extruded expanded polypropylene-based resin particles, the method comprising:

a first step of producing an extruded expanded article by an extrusion expansion method with (a) a modified polypropylene resin and (b) a carbonic acid gas serving as a blowing agent; and a second step of producing extruded expanded particles by cutting the extruded expanded article, obtained in the first step, in a particle shape, wherein the (a) modified polypropylene resin is obtained by melting and kneading a random polypropylene resin, a conjugated diene compound, and a radical polymerization initiator to obtain a modified polypropylene resin, the random polypropylene resin containing an ethylene unit in an amount of more than 0.0% by weight and not more than 2.5% by weight with respect to 100 parts by weight of the random polypropylene resin, and wherein the random polypropylene resin has a melt flow rate (MFR) of not less than 5.0 g/10 minutes and not more than 20.0 g/10 minutes, the conjugated diene compound blended in the melting and kneading comprises not less than 0.01 parts by weight and not more than 5.00 parts by weight with respect to 100 parts by weight of the random polypropylene resin, the radical polymerization initiator blended in the melting and kneading comprises not less than 0.01 parts by weight and not more than 5.00 parts by weight with respect to 100 parts by weight of the random polypropylene resin, wherein the radical polymerization initiator is a mixture containing at least one kind of organic peroxide (A) having a structure represented by the following Formula (1) and at least one kind of organic peroxide (B) having at least one structure represented by the following Formula (4) or (5), wherein each of the at least one kind of organic peroxide (A) and the at least one kind of organic peroxide (B) have a ten-hour half-life temperature of 90° C. to 150° C.,

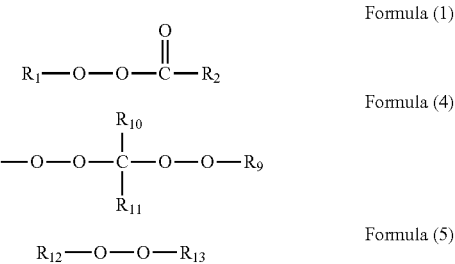

where: $R_1$, $R_8$, $R_9$, and $R_{13}$ are each independently hydrogen, a substituted or unsubstituted alkyl group having 1 to 8 carbon atoms, or a substituted or unsubstituted aryl group having 6 to 12 carbon atoms, and are optionally identical to or different from each other;

$R_2$ is a substituted or unsubstituted alkyl group having 1 to 8 carbon atoms, a substituted or unsubstituted aryl group having 6 to 12 carbon atoms, or a substituted or unsubstituted alkoxy group having 1 to 8 carbon atoms;

$R_{10}$ and $R_{11}$ (a) are each independently a substituted or unsubstituted alkyl group having 1 to 8 carbon atoms or a substituted or unsubstituted aryl group having 6 to 12 carbon atoms, and are optionally identical to or different from each other or (b) form a substituted or unsubstituted cycloalkyl group having 3 to 8 carbon atoms together; and $R_{12}$ is a substituted or unsubstituted alkyl group having 1 to 10 carbon atoms or a substituted or unsubstituted aryl group having 6 to 12 carbon atoms, wherein the modified polypropylene resin is a resin in which a ratio ($\eta 30/\eta 1$) between an elongation viscosity $\eta 1$ for an elongation time of 1 second and an elongation viscosity $\eta 30$ for an elongation time of 30 seconds is not less than 40.0 and not more than 100.0, each of the elongation viscosity $\eta 1$ and the elongation viscosity $\eta 30$ being measured at a temperature of 180° C. and a strain rate of 0.1/second, and wherein when subjected to extraction in p-xylene at 130° C. for 6 hours with use of a metal gauze having a mesh size of 37 μm (400-mesh metal gauze), the modified polypropylene resin has a gel fraction of not less than 0.5% by weight and not more than 1.5% by weight with respect to 100% by weight of the modified polypropylene resin.

7. The method of producing extruded expanded polypropylene-based resin particles according to claim 6, wherein a melt tension at break of the modified polypropylene resin is not more than 10.0 cN at a temperature of 200° C. and a take-off speed at break of the modified polypropylene resin is not less than 4.5 m/minute and not more than 6.0 m/minute at a temperature of 200° C.

* * * * *